United States Patent [19]

Wakabayashi et al.

[11] Patent Number: 4,789,875
[45] Date of Patent: Dec. 6, 1988

[54] VARIABLE FOCUS CAMERA

[75] Inventors: Hiroshi Wakabayashi, Yokohama; Daiki Tsukahara, Kawasaki; Akira Katayama, Koganei; Kiyosada Machida, Yokohama; Kazuyuki Kazami, Tokyo; Yuji Katano, Kawasaki; Hiroshi Terunuma, Ichikawa; Mitsuru Higuchi, Tokyo, all of Japan

[73] Assignee: Nikon Corporation, Tokyo, Japan

[21] Appl. No.: 60,987

[22] Filed: Jun. 10, 1987

Related U.S. Application Data

[63] Continuation of Ser. No. 811,165, Dec. 19, 1985, abandoned, which is a continuation-in-part of Ser. No. 772,710, Sep. 5, 1985, Pat. No. 4,643,555.

[30] Foreign Application Priority Data

| Dec. 21, 1984 | [JP] | Japan | 59-269815 |
| Feb. 27, 1985 | [JP] | Japan | 60-38185 |
| Mar. 1, 1985 | [JP] | Japan | 60-41475 |
| Mar. 11, 1985 | [JP] | Japan | 60-34372[U] |
| Mar. 22, 1985 | [JP] | Japan | 60-41837[U] |
| Mar. 22, 1985 | [JP] | Japan | 60-41838[U] |
| Apr. 5, 1985 | [JP] | Japan | 60-50698[U] |
| Apr. 8, 1985 | [JP] | Japan | 60-51865[U] |
| Apr. 12, 1985 | [JP] | Japan | 60-77669 |

[51] Int. Cl.$^4$ ............................................. G03B 3/00
[52] U.S. Cl. ........................... 354/195.1; 354/195.12; 354/402; 354/187; 354/485
[58] Field of Search ........... 354/195.1, 195.11, 195.12, 354/400, 402, 199, 222, 187, 403, 485

[56] References Cited

U.S. PATENT DOCUMENTS

| 4,214,829 | 7/1980 | Ohashi | 354/195.12 |
| 4,519,691 | 5/1985 | Yamada et al. | 354/400 |
| 4,525,050 | 6/1985 | Ohashi | 354/195.12 |
| 4,529,283 | 7/1985 | Oshima et al. | 354/195.12 |
| 4,540,264 | 9/1985 | Daitoku et al. | 354/195.12 |
| 4,547,053 | 10/1985 | Tobler | 354/187 |
| 4,597,657 | 7/1986 | Wakabayashi | 354/195.12 |
| 4,643,555 | 2/1987 | Wakabayashi | 354/403 |
| 4,669,848 | 6/1987 | Wakabayashi | 354/195.12 |

Primary Examiner—Russell E. Adams
Attorney, Agent, or Firm—Shapiro and Shapiro

[57] ABSTRACT

Variable focus camera includes primary and secondary lens systems, in which only the primary lens system is used for wide angle shots while the combination of the primary with the secondary lens system is used for telephoto shots.

The variable focus camera can exactly and positively control the focus change region, the automatic focusing region and other regions.

26 Claims, 16 Drawing Sheets

VARIABLE FOCUS CAMERA

This is a continuation application of Ser. No. 811,165 (now abandoned) filed Dec. 19, 1985, which is a continuation-in-part application of Ser. No. 772,710 filed Sept. 5, 1985, now U.S. Pat. No. 4,643,555, issued Feb. 17, 1987.

BACKGROUND OF THE INVENTION

1. Field of the Invention

The present invention relates to a camera having a photo-taking optical system which can be changed between at least two focal lengths and more particularly to a camera including primary and secondary lens systems, in which only the primary lens system is used for wide angle shots while the combination of the primary with the secondary lens system is used for telephoto shots.

2. Description of the Prior Art

There is known a variable focus type camera having a photo-taking optical system which comprises primary and secondary lens systems, the primary lens system being movable along the optical axis while the secondary lens system being movable into and out of the beam of photo-taking light, whereby the focal length of the photo-taking optical system can be changed from wide angle mode to telephoto mode or vice versa. The primary lens system is movable between three regions, hat is, wide-angle, focus change and telephoto which are defined by four points aligned in a direction from the surface of a film toward an object. In the wide angle region, the photo-taking optical system is defined only by the primary lens system to provide a wide-angle focus. When the primary lens system is moved in the wide-angle region from the first point to the second, the focused subject distance is changed, for example, from the infinite point toward the close point. When the primary lens system is moved in the focus change region from the second point to the third point, the secondary lens system is inserted into the beam of photo-taking light to combine with the primary lens system such that the photo-taking optical system will be changed from the wide-angle mode to the telephoto mode. When the primary lens system is moved in the telephoto region from the third point to the fourth point, the focused subject distance is changed from the infinite point to the close point.

If an automatic focusing device is incorporated into such a camera, information concerning the position of the photo-taking optical system at the respective different regions must exactly be detected to control the automatic focusing device.

SUMMARY OF THE INVENTION

It is therefore an object of the present invention to provide a variable focus camera which can exactly and positively control) the focus change region the automatic focusing region and other regions.

DESCRIPTION OF PREFERRED EMBODIMENTS

Figure 1:
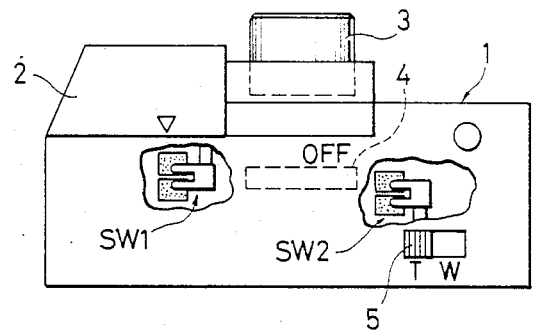
FIG. 1 is a plan view of one embodiment of a camera according to the present invention, the camera being in its telephoto mode.
Figure 2:
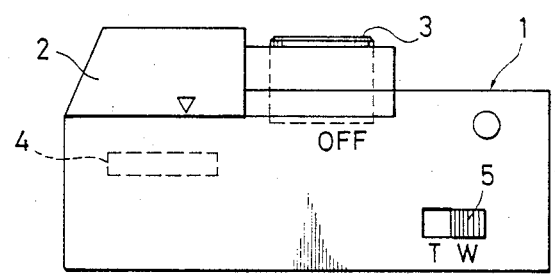
FIG. 2 is a view similar to FIG. 1, the camera being in its wide angle mode.
Figure 3:
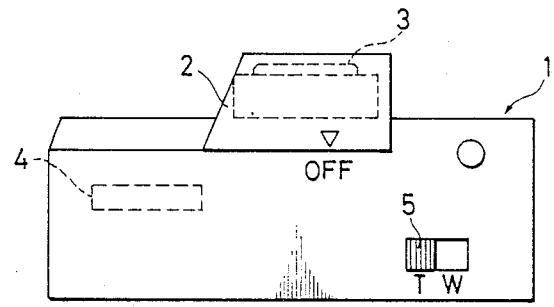
FIG. 3 is a view similar to FIGS. 1 and 2, the camera being in its storage mode.

Referring first to FIGS. 1 to 3, there is shown a camera housing 1 the forward face of which comprises a dust protective cover 2 movable laterally and a primary lens system 3 constituting a photo-taking optical system and being shiftable along the optical axis. The camera housing 1 contains a secondary lens system 4 co-operating with the primary lens system 3 and being shiftable across the optical axis of the primary lens system 3.

The housing 1 also includes a selector knob 5 on the top face thereof for changing the focal length of the photo-taking optical system.

In the position of FIG. 1, the cover 2 is opened. The selector knob 5 is set at a position indicating a telephoto region as shown by the letter "T". The primary lens system 3 is in an extended position in which it is moved forwardly beyond the forward face of the cover 2 to combine with the secondary lens system located on the optical axis of the primary lens system to form a composite lens system providing a focal length in the telephoto region.

In FIG. 2, the selector knob 5 is in a position indicating a wide-angle region as shown by the letter "W". At this time, the primary lens system 3 is in its retracted position in which it is retracted into the housing 1. The secondary lens system 4 also is in its retracted position. Therefore, the camera is set at a position providing the focal length in the wide-angle region.

In FIG. 3, the cover 2 is in its closed position in which it covers the primary lens system 3 located in its retracted position irrespective of the indication of the selector knob 5 relative to the telephoto mode. The secondary lens system 4 remains at its retracted position. In order that it is visible from above the camera that no photographing can be performed when the cover 2 is in its closed position, an indicating mark on the to of the cover 2 faces the word "OFF" on the top of the camera housing 1.

The housing 1 further contains a switch SW1 operably associated with the cover 2 and another switch SW2 operably associated with the selector knob 5. The switch SW 1 includes a slide blade rigidly secured to the cover 2 and a conductor land rigidly connected with the camera housing 1. The switch SW 1 is in its ON position when the cover 2 is opened and in its OFF position when the cover 2 is closed. The switch SW1 functions to control the rotational direction of a motor 12 for moving the primary lens system as will be described and at the same time to energize a shutter control circuit 31 which will be described hereinafter.

The switch SW 2 includes a slide blade rigidly connected with the knob 5 and a conductor land rigidly secured to the camera housing 1. The switch SW 2 is actuated by the knob 5 to control the rotational direction of the motor 12. The switch SW 2 is in its ON position when the knob 5 is in its telephoto position and in its OFF position when the knob 5 is in its wide-angle position.

Figure 4:
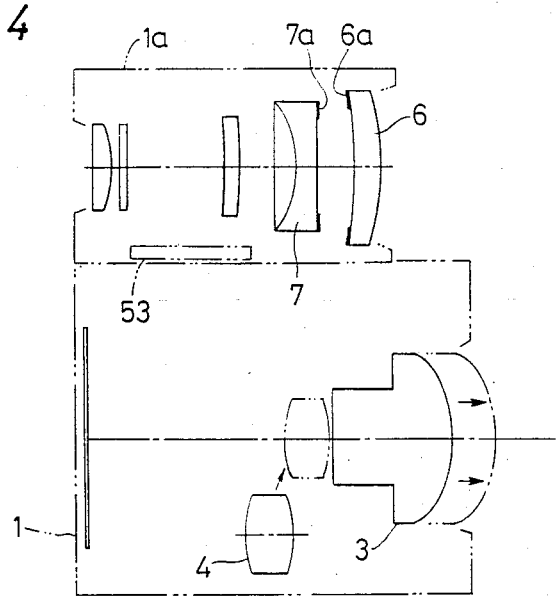
FIG. 4 is a side view schematically showing the optical system of the camera.

The upper portion of the housing 1 has a finder-containing section 1a which houses an inverted Galilean finder optical system comprising a first finder lens system 6 of positive refracting power and a second finder lens system 7 of negative refracting power, as seen in FIG. 4.

A light-exclusion mask 6a for blocking any undesirable light is printed on the rearward face of the first finder lens system 6 while a similar mask 7a is printed on the forward face of the second finder lens system 7. The mask 6a is in the form of a square frame to function as a field stop when the telephoto mode is selected in the camera. On the other hand, the mask 7a is in the form of a square frame to serve as a field stop when the wide-angle mode is selected.

Figure 5:
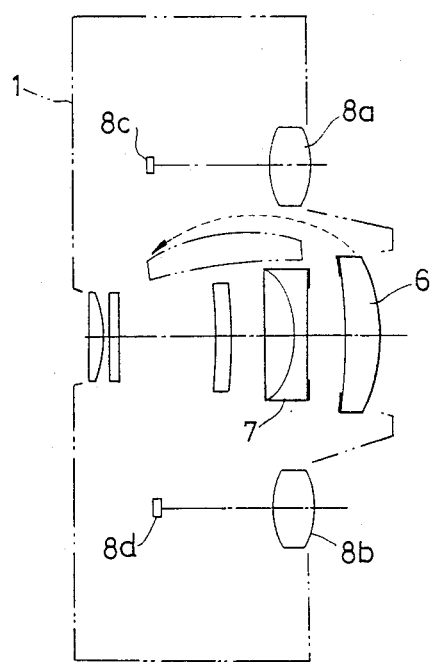
FIG. 5 is a plan view of the optical system shown in FIG. 4.

As seen from FIG. 5, automatic focusing (AF) lens systems 8a and 8b are disposed on the opposite sides of the finder optical system. A light emitting element 8c is located behind the AF lens system 8a while a light receiving element 8d is disposed behind the AF lens system 8b.

Figure 6:
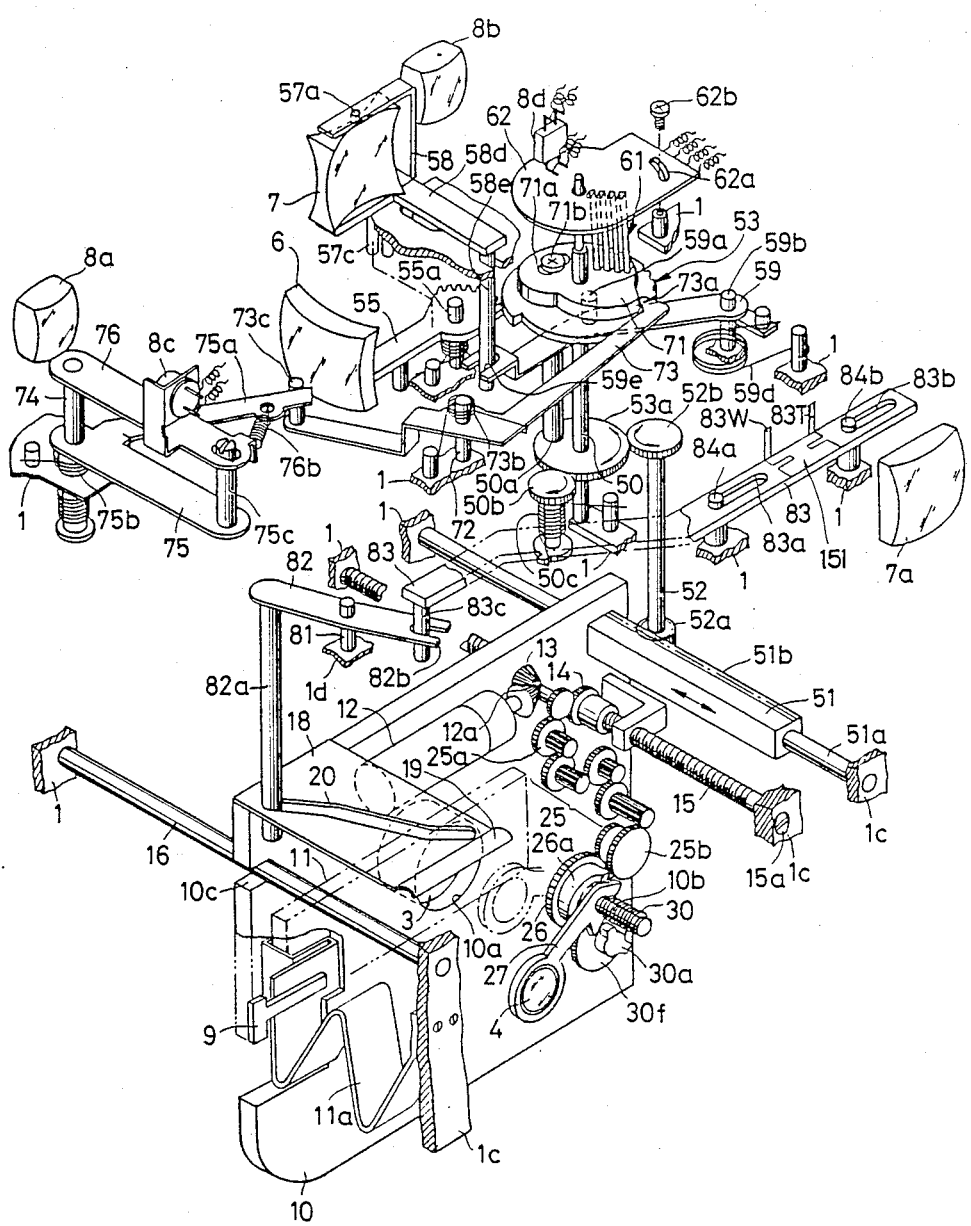
FIG. 6 is a perspective view of a drive mechanism used in the camera.

FIG. 6 shows a mechanical apparatus in the camera housing 1, which comprises a drive mechanism for the primary lens system, a drive mechanism for the secondary lens system, a changing mechanism for the finder and other internal mechanisms.

In FIG. 6, the camera is viewed rearwardly. A base plate 10 has an opening 10a formed therein at the central position, through which a beam of photo-taking light passes. The primary lens system 3 is disposed in the forward portion of the opening 10a. A stop and shutter device 11 is located rearwardly of the opening as shown by a phantom line in FIG. 6. The stop and shutter device 11 is electrically and mechanically connected with one end of a flexible substrate 11a through a keeper plate 9, the flexible substrate 11a having a control signal transferring circuit printed thereon. The stop and shutter device 11 can be thus controlled by a camera control, which will be described, through the electric circuit on the substrate 11a.

The other end of the flexible substrate 11a is rigidly connected with a foundat;on plate 1c of the housing 1. The intermediate portion of the flexible sustrate 11a between the opposite ends thereof is zigzagged in a direction not intersecting the photo-taking optical path.

The stop and shutter device 11 can be moved vertically relative to the foundation plate 1c by the base plate 10, as will be described. When the base plate 10 is spaced away from the foundation plate 1c, the flexible substrate 11a is extended. The flexible substrate 11a can be folded over as the base plate 10 is moved toward the foundation plate 1c.

The motor 12 is mounted on the upper and rearward wall of the base plate 10, and the rotating shaft of the motor rigidly supports a bevel gear 12a at one end. The bevel gear 12a is engaged by a gear 13 on the base plate 10. The gear 13 has a spur gear formed integrally therewith, which in turn engages a gear 14 rotatably supported by a holding arm on the base plate 10, the gear 14 being not movable axially.

The gear 14 includes a bore formed therethrough at the center, which bore is internally threaded. The internal threads of the gear 14 engage external threads on a guide shaft 15 which extends along the optical axis, as seen from FIG. 7. The proximal end of the guide shaft 15 is fixed to the foundation plate 1c of the housing 1 by means of a set screw 15a. On the other hand. the distal end 15b of the guide shaft 15 is inserted into a bore in the housing 1 through the base plate 10. Since the distal end 15b includes a slot 15c formed therein, the guide shaft 15 can be rotated by means of any suitable tool to adjust the position of the base plate 10 when the set-screw 15a is loosend.

A concealing cover 15e is inserted into the foundation plate 1c. The foundation plate 1c also supports a guide shaft 16 extending along the optical axis and which is inserted into a notch 10c in the base plate 10 to be axially slidable therein.

Figure 8:
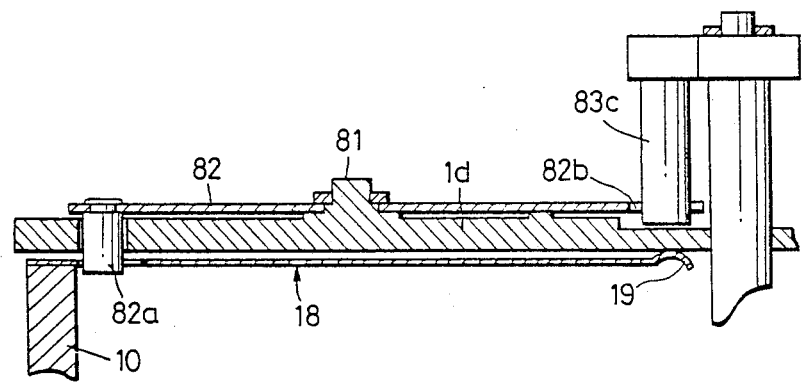
FIG. 8 is a cross-sectional view illustrating the action of a resilient cam plate.

The base plate 10 rigidly supports the proximal end of a cam plate 18 which extends along the direction in which the cam plate 10 is moved. The base plate 18 is resilient, with the distal end thereof including a slide portion 19 formed thereon. The slide portion 19 of the cam plate 18 is slidably engaged by a fixed wall 1d extending from the foundation plate 1c in the direction in which the base plate 10 is moved (see FIG. 8.

In such an arrangement, when the motor 12 is energized, the base plate 10 is moved parallel to the optical axis through the engagement of the gear 14 with the guide shaft 15. Accordingly, the primary lens system 3 and the stop and shutter device 11 mounted thereon are shifted along the optical axis between their extended and retracted positions. Since the fixed wall 1d is resiliently engaged by the cam plate 18, the guide shaft 16 will be engaged by the notch 10c without play. As a result, the base plate 10 can be moved perpendicularly relative to the optical axis without deviation of the optical axis of the primary lens system 3.

The rearward face of the base plate 10 rotatably supports a reduction gear train 25, a cam gear 26 and a holder 27. The holder 27 holds the secondary lens system 4 through a supporting sleeve 4e. An input gear 25a in the gear train 25 engages a spur gear integral with gear 13 while a final gear 25b in the same gear train 25 engages the cam gear 26.

The cam gear 26 is coaxially connected with the holder 27 through a face cam 26a on the end face of the cam gear 26.

The reduction ratio of the gear train 25 is such that when the primary lens system 3 is in its extended position, the secondary lens system 4 is placed in its inserted position in which it is inserted into the beam of photo-taking light, as shown by a phantom line in FIG. 6. When the primary lens system 3 is in its retracted position, the secondary lens system 4 is retracted out of te beam of photo-taking light, as shown by a solid line in FIG. 6.

Figure 9A:
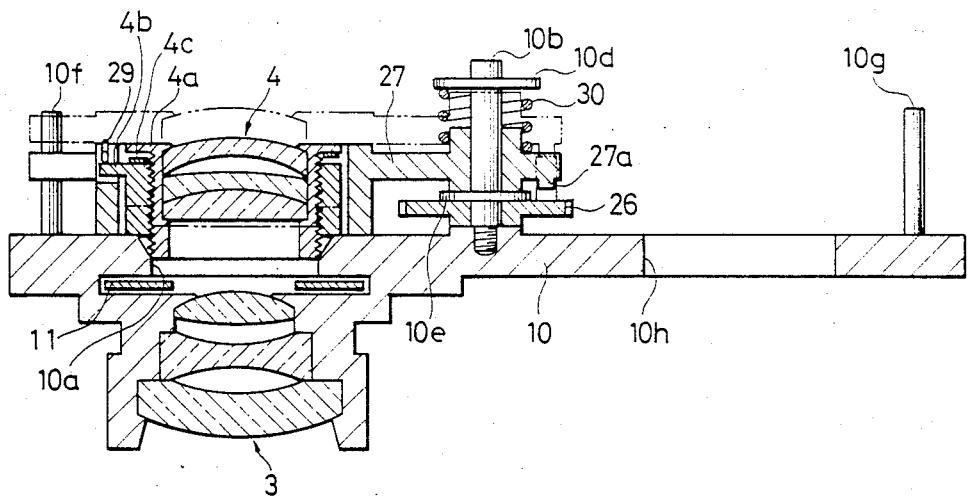
FIGS. 9A and 9B are cross-sectional views showing a drive mechanism for a secondary lens system.
Figure 9B:
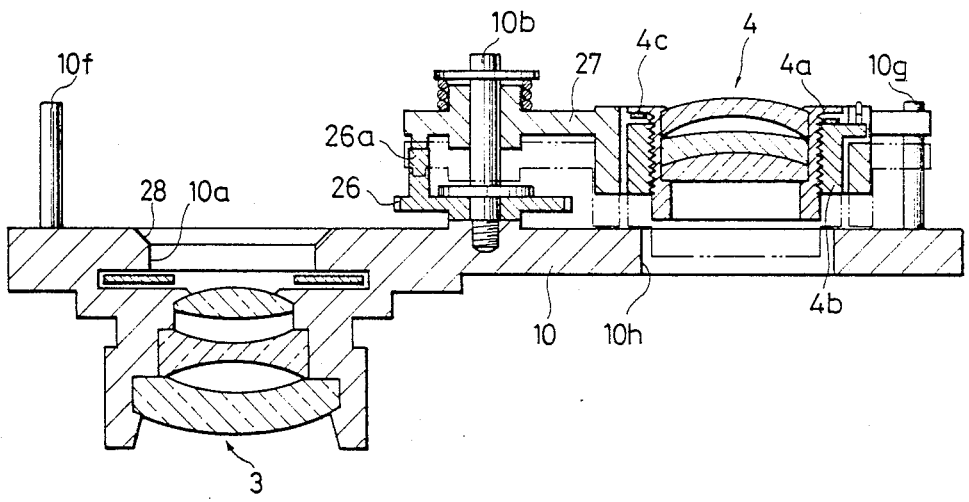

FIGS. 9A and 9B illustrate a drive mechanism for the secondary lens system 4. As seen from these figures, the primary lens systen 3 and the stop and shutter device 11 are rigidly mounted on the base plate 10 forwardly of the opening 10a. The entrance of the opening 10a is chamfered to form a guide face 28.

The secondary lens system 4 is held within a cylindrical sleeve 4a which is screwed integrally onto the internal threaded perimeter of a support ring 4b. When the bottom of the sleeve 4a is engaged by the internal perimeter of the opening 10a and the bottom face of the support ring 4b is engaged by the rearward face of the base plate 10, the optical axis of the secondary lens system 4 will coincide with that of the primary lens system 3. Thus, the secondary lens system 4 will be positioned in place in the direction of the optical axis.

The holder 27 is rotatably and slidably supported by a stud 10b on the base plate 10 between two flanges 10d and 10e. The holder 27 is biased downwardly by means of a coil spring 30. The central bore of the holder 27 contains the sleeve 4a and the support ring 4b.

Figure 10:
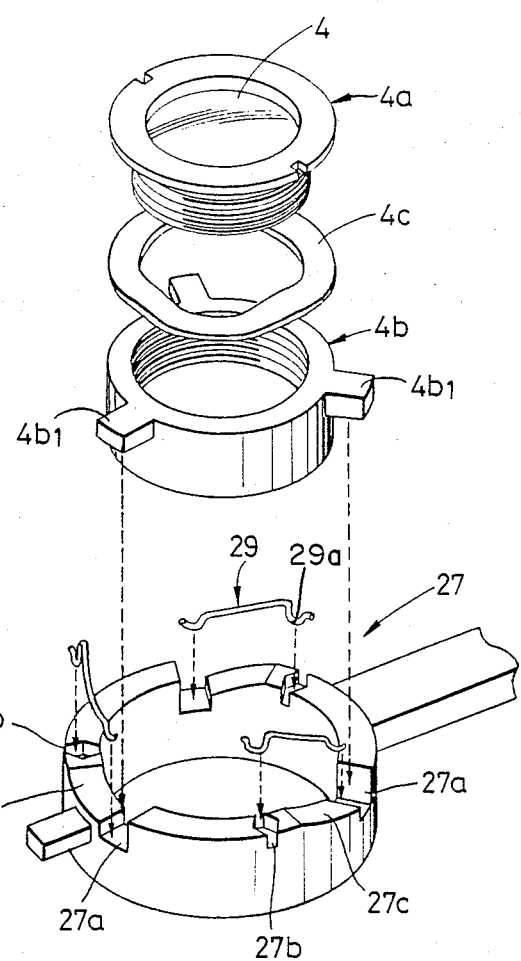
FIG. 10 is an exploded and perspective view of a support mechanism for the secondary lens system.

As shown in FIG. 10, the top of the sleeve 4a is provided with a flange. Between this flange and the top face of the support ring 4b is interposed a wave washer 4c for eliminating any play therebetween. The support ring 4b includes three lugs 4b1 extending outwardly from the top thereof and spaced equiangularly from one another. On the other hand, the central sleeve portion of the holder 27 is provided with three radial grooves 27a each receiving the corresponding lug 4b1 and three fitting holes 27b each forming a set with the corresponding radial groove 27a. A slope 27c is formed on the holder 27 between each of the radial grooves 27a and the corresponding fitting hole 27b such that the slope 27c will extend downwardly from the fitting hole 27b toward the radial groove 27a. Each of springs 29 is firmly received at the base end 29a thereof in the corresponding fitting hole 27b. The spring 29 extends into the radial groove 27a along the slope 27c with the forwardmost end thereof being formed with a keeping portion.

Figure 11:
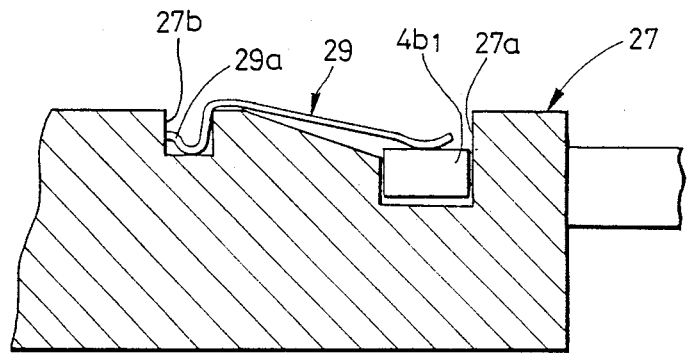
FIG. 11 is a cross-sectional view showing, in an enlarged scale, the primary parts shown in FIG. 10.

As seen from FIG. 11, each of the lugs 4b1 on the support ring 4b is positioned in the corresponding radial groove 27a on the holder 27 and then resiliently held by the keeping portion of the spring 29.

When the secondary lens system 4 is in the position of FIG. 9A, the free end of the holder 27 engages a stop pin 10f. In the position of FIG. 9B, the free end of the holder 27 engages a stop pin 10g.

The base plate 10 is further provided with a circular opening 10h into which the sleeve 4a will fall when it is retracted out of the optical path of the primary lens system.

Figure 12A:
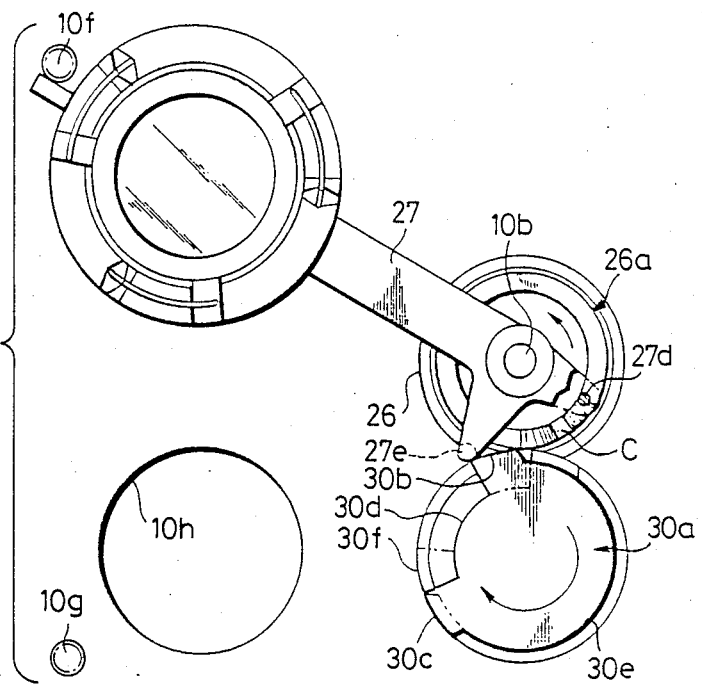
FIGS. 12A and 12B are plan views showing the drive mechanism for the secondary lens system.
Figure 12B:
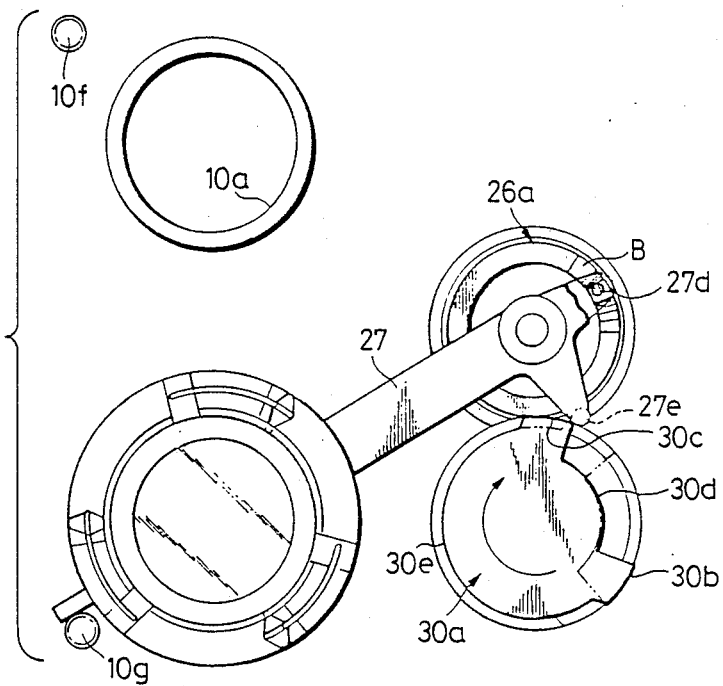

The face cam 26a of the cam gear 26 on the shaft 10b contacts a stylus 27d on the bottom face of the holder 27 (see FIGS. 12A and 12B).

FIG. 9A shows the secondary lens system 4 placed in its fully inserted position in which it is inserted into the optical path of the primary lens system 3 and positioned on the base plate in place. The secondary lens system 4 may also be positioned in the following positions:

The secondary lens system 4 may be placed in a partially inserted position (shown by phantom lines in FIG. 9A) in which it is in the optical path of the primary lens system but not lifted by the face cam 26a to complete its positioning, a partially retracted position (shown by solid lines in FIG. 9B) in which the secondary lens system 4 is supported above the circular opening 10h by the face cam 26a, and a fully retracted position (shown by phantom lines in FIG. 9B) in which the sleeve 4a is completely positioned within the circular opening 10h.

FIGS. 12A and 12B show a mechanism for preventing the backward motion of the secondary lens system, which is operably associated with the drive mechanism for the same.

The cam gear 26 is engaged by a stopping gear 30f on which a stoppIng plate 30a is rigidly mounted. The stopping plate 30a includes first and second contact surfaces 30b, 30c and a notch 30d. The contact surfaces 30b and 30c are respectively engageable with a contact portion 27e on the holder 27.

FIG. 12A shows the secondary lens system 4 latched at its fully or partially inserted position. FIG. 12B shows the secondary lens system 4 latched at its fully or partially retracted position.

Figure 13:
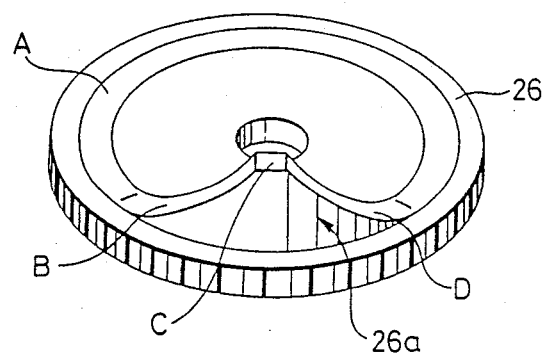
FIG. 13 is a perspective view of a face cam.
Figure 14:
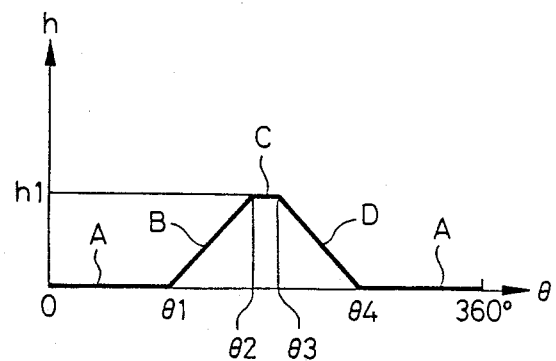
FIG. 14 is a cam diagram of the face cam.

As seen from, FIG. 13, the face cam 26a has a lift in the rotational direction of the gear 26. FIG. 14 is a cam diagram of the cam 26a. The face cam 26a has a first flat section A in which lift is not changed through a section $0$-$\theta1$ of the rotational angle $\theta$ and through another section $\theta4$-$360°$ of the same, a first slope section B in which the lift h is changed to linearly increase from 0 to h1 through an angle section $\theta1$-$\theta2$ a second flat section C in which the lift h is maintained at h1 through an angle section $\theta2$-$\theta3$ and a second slope section D in which the lift h is changed to linearly decrease from h1 to 0 through a further angle section $\theta3$-$\theta4$.

As shown in FIG. 6, the rearward face of the base plate 10 is provided with a rack 51 which is guided by a guide shaft 51a rigidly mounted at its proximal end on the foundation plate 1c. The guide shaft 51a extends slidably through the base plate 10.

Teeth on the rack 51 are engaged by a pinion 52a rigidly mounted on the lower end of a shaft 52 which extends through a partition (not shown) for light-exclusion between the taking optical system and the finder optical system.

A spur gear 52b is operably connected with a control cam member 53 through a gear 53a. The control cam member 53 includes a cam plate 71 which operably connects the photo-taking optical system (3, 4) with an active trigonometry type automatic focusing (AF) device which includes a cam lever 73 and other subsequent parts as will be described hereinafter. The top face of the cam plate 71 rigidly supports a detecting brush plate 61 slidably contacting a printed circuit substrate 62 which will be described hereinafter. The brush plate 61 includes four brushes 61a, 61b, 61c and 61d which are electrically connected with one another.

The gear 53a is connected integrally with the control cam member 53 through a strut 50a. The gear 53a is engaged by a gear 50b which is blased in the direction of the arrow under the action of a spring 50c. There is thus no back-lash between the gears 53a and 52b and between the gear 52a and the rack 51b.

Figure 15:
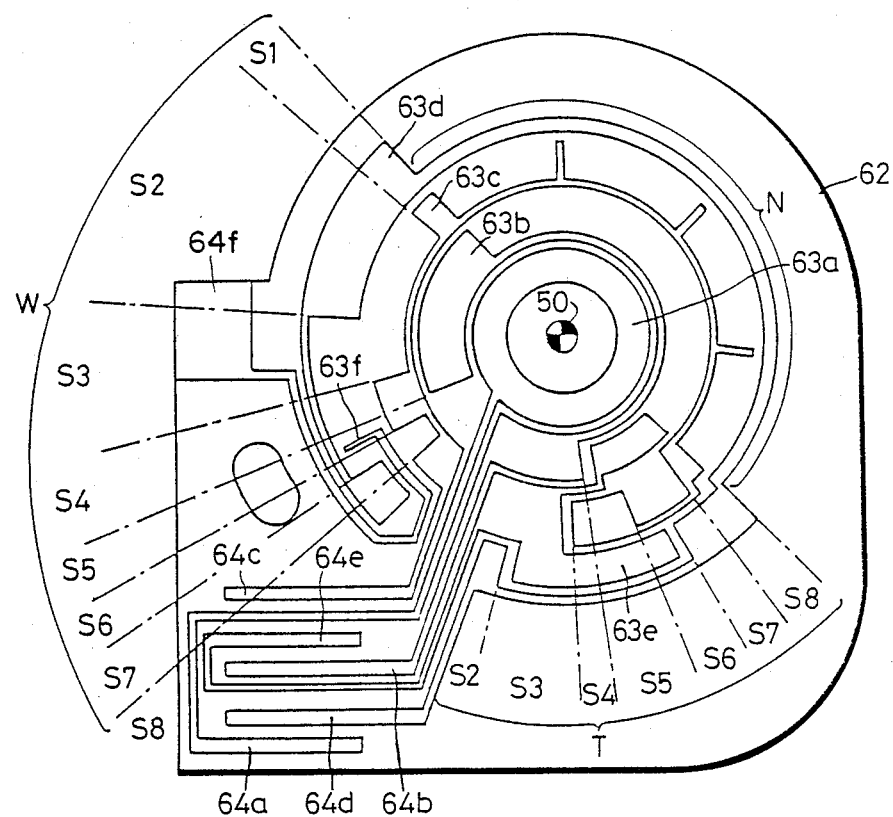
FIG. 15 is a plan view illustrating a substrate of an encoder.

An encoder is provided above the cam plate 71 and supported by a substrate 62 the central portion of which is latched to the shaft 50 to be stationary relative to the camera housing 1. The bottom face of the substrate 62 is formed with a plurality of circular conductor patterns 63a to 63e disposed coaxially about the shaft 50 as shown in FIG. 15.

These conductor patterns include a first grounding pattern 63a, a second photo-taking pattern 63b, a third pattern 63c, a fourth pattern 63d and a fifth pattern 63e which are disposed in sequence starting from the center of the substrate 62. To match the fact that the photo-taking optical system has a wide-angle region, a telephoto region and a change between the wide angle and telephoto regions, the conductor patterns are circumferentially divided into a first region W, a second region N and a third region T. The fifth pattern 63e is a region discriminating pattern located within the range of the region T and disposed between the second and fourth patterns 63b, 63d or between the second and third patterns 63b, 63c. Terminals 64a to 64e respectively connecting with the patterns 63a to 63e are provided on the end of the printed substrate 62.

A reference position adjusting pattern 63f is further provided which is adapted to determine the positional relationship between the photo-taking optical system and the respective conductor patterns. The pattern 63f has a width that depends on the required accuracy in positioning. A terminal 64f connecting with the pattern 63f is provided on the end of the substrate 62. Each of the patterns 63a to 63e contacts the tip of the corresponding one of the brushes 61a, 61b, 61c and 61d in the brush plate 61.

When the photo-taking optical system (3,4) is moved through the entire stroke from the infinity position in the wide-angle region to the closed position in the telephoto region, each of the brushes 61a, 61b, 61c and 61d is moved about the shaft 50 through an angle less than 360 degrees. Depending on the position of the photo-taking optical system, electric output signals from the patterns 63a to 63e are digitally varied. These electric output signals are decoded to provide signals indicative of the position of the photo-taking optical system (3, 4). The signals also are used to control the ON and OFF positions of switches SW3, SW4 and SW5 all of which will be described hereinafter.

The arrangement is such that when each of the brushes 61a to 61d contacts the corresponding pattern to create an electrically conductive state, a circuit (not shown) will generate a Low signal and a when that brush is moved off of a pattern and engages insulation, the above circuit will produce a High signal. Supposing that the outputs from the pattern 63b belong to "CODE A", the outputs from the pattern 63d "CODE B", and the outputs from the pattern 63c "CODE C", various step outputs shown in Table 1 can be obtained from various combinations of the code outputs.

TABLE 1

| STEP → | S8 | S7 | S6 | S5 | S4 | S3 | S2 | S1 |
|---|---|---|---|---|---|---|---|---|
| CODE A | H | H | H | H | L | L | L | L |
| CODE B | L | L | H | H | H | H | L | L |
| CODE C | L | H | H | L | L | H | H | L |

↑ ↑      ↑ ↑
Q1 Q2      Q3 Q4

In either of the wide-angle or telephoto regions (W; T), a change point Q1 between the steps S8 and S7 corresponds to the wide-angle infinity point a or the telephoto infinity point f on a cam face, which will be described, at a reset position wherein the photo-taking optical system begins to meter the distance between the camera and an object.

A change point Q2 between the steps S7 and S6 is a stopping position wherein the photo-taking optical system will be stopped to initiate a photographing operation since a beam emitted from the camera to the object does not substantially return to the camera when an active type automatic focusing device is used in that camera.

Steps S6–S1 provide positional information used in the so-called flashmatic control wherein a step is changed to control exposure under a constant emission from a flash device.

A change point Q3 between the steps S2 and S1 is a stopping position wherein the photo-taking optical system extended from the telephoto position is stopped to prevent its uncontrolled movement.

In the wide-angle region W, the steps S8–S1 are disposed clockwise. In the telephoto region T, the steps S8–S2 are used while a change point Q4 between the steps S3 and S2 is used as the closest stopping position.

One of the patterns 63a–63e which is required to have a higher accuracy is disposed nearer the external perimeter of the substrate 62. This is because movement can more accurately be detected at a position nearer the external perimeter of the substrate wherein the movement is increased relative to the angular displacement.

The patterns 63a and 63b are not required to have very high accuracies with respect to their positions since the pattern 63a is used for grounding and the pattern 63b is utilized only for the flashmatic control. On the contrary, the pattern 63d is used to output the change point Q2. Therefore, the focused position will highly be influenced by a slight motion of lens in an increased distance.

The pattern 63c also is required to have a higher accuracy since it must generate stopping and reset signals for the close distance. The pattern 63f also is required to have a higher accuracy since the adjusted reference position determines the accuracy in the entire system. As a result, the patterns required to have higher accuracies should be disposed nearer the external perimeter of the substrate.

The control cam member 53 provides control means for a finder changing mechanism. As shown in FIGS. 16–20, the control cam member 53 includes a cam groove 54 formed thereon at the lower portion, a tooth train including a first tooth 53b and a second and subsequent teeth 53c formed on the peripheral edge of the control cam member 53, the second tooth being spaced away from the first tooth 53b by one tooth, and a sliding edge 53d.

A changing lever 55 is pivotally connected with the finder containing portion 1a through a pivot pin 55a at a position close to the cam member 53. The lever 55 comprises a sector portion 55d having a tooth train (55b and 55c) corresponding to the tooth train (53b and 53c) on the cam member 53, a cam portion including first and second cam faces 55e, 55f formed about the pivot pin 55a and an arm 55h.

A support arm 55i extends upwardly from the tip of the arm 55h. The first finder lens system 6 of positive refracting power is rigidly mounted on the upper end face of the support arm 55i.

The change lever 55 is based clockwis under the action of a spring 55j.

The second finder lens system 7 is rotatably supported by a holder 58 through a pivot pin 57a. The holder 58 is movable along the optical path of the finder.

A rod 57c extends outwardly from the bottom face of the lens system 7 with the tip thereof being engaged by a cam portion 55e on the change lever 55.

The cam groove 54 on the cam member 53 is engaged by a driven pin 59a on a pivot lever 59 which can selectively be held at the telephoto or wide-angle position by a toggle spring 59d which turns lever 59 about a pivot pin 59b.

The cam groove 54 includes a first circumference groove section 54a effective to hold the driven pin 59a inoperative, a drive groove section 54b effective to move the driven pin 59a and a second circumference groove section 54c effective to maintain the driven pin 59a inoperative.

The tip of the pivot lever 59 is formed with a fork 59e which is engaged by a driven rod 58e extending downwardly from an arm 58d on the holder 58.

Figure 18:
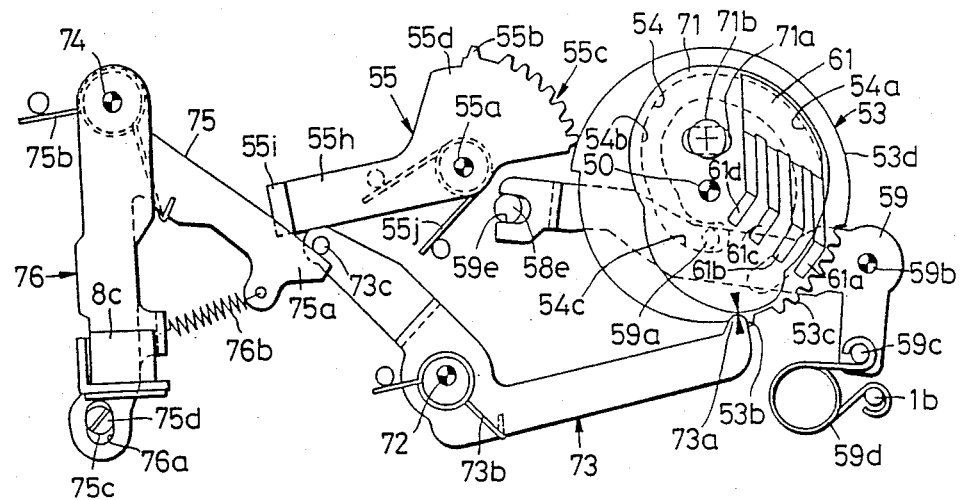
FIG. 18 is a plan view of a drive mechanism for an automatically focus detecting projector.
Figure 19:
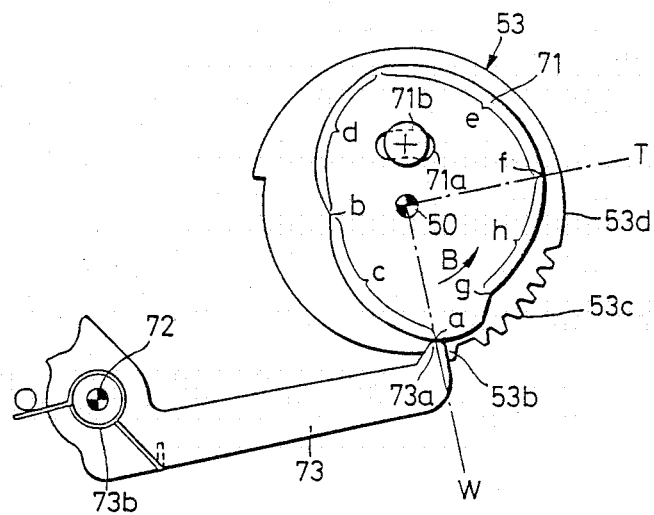
FIGS. 19 and 20 are plan views showing a cam member.
Figure 20:
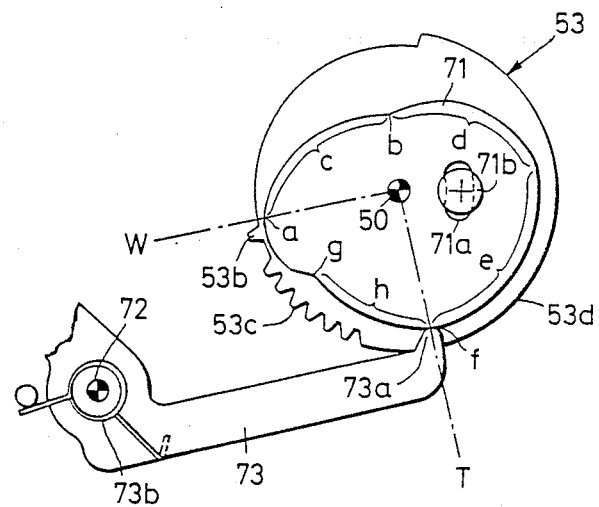

FIGS. 18 to 29 illustrate AF change apparatus which comprises a cam face of a synthetic resin material molded integrally on the external primeter of the cam plate 71. As shown in FIGS. 19 and 20 this cam face includes a wide angle region c from a wide-angle infinity point a to a wide-angle close point b, a transient region d, a stand by region e and a telephoto region h from a telephoto infinity point f to a telephoto close point g, all of which regions are continuously formed on the cam plate 71. The wide angle infinity point a whereat the focusing in the wide-angle region c is initiated and the telephoto infinity point f whereat the focusing in the telephoto region h is begun are spaced away from the pin 50 by the same distance. The wide-angle close point b is spaced apart from the pin 50 by a distance different from that of the telephoto close point g since there is a difference between photo-taking distance limits of the wide-angle and telephoto close points b and g.

As seen from FIG. 18, the housing 1 rotatably supports a cam lever 73 through a pivot pin 72, which is urged against the cam face under the action of a spring 73b.

The other end of the cam lever 73 rigidly supports an engagement pin 73c which is engaged by an arm 75a on an interlocking lever 75 which is rotatably supported by the housing 1 through a pivot pin 74. A lever 76 for holding the light emitting element 8c also is rotatably supported by the housing 1 through the pivot pin 74 coaxially with the interlocking lever 75.

The interlocking lever 75 is biased counterclockwise by a spring 75b which is wound about a pivot pin 74. The levers 75 and 76 are connected with each other through an eccentric pin 75c. A tension spring 76b is spanned between the levers 75 and 76.

Figure 21:
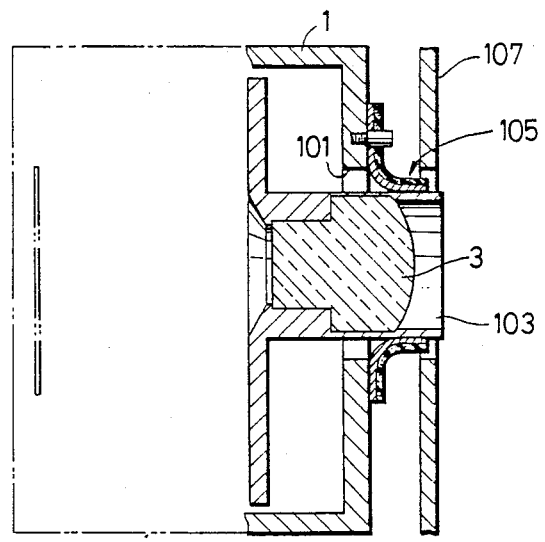
FIG. 21 a fragmentary and cross-sectional view of a camera housing.

The housing 1 is formed with a circular opening through which a barrel holding the primary lens system 3 extends. As shown in FIG. 21, a light-exclusion sheet 105 is provided by, which any external light can be prevented from penerating into the housing through a gap between an opening 101 and the outer perimeter of the barrel 103. The sheet 105 is in the form of a composite member comprising a cloth of synthetic fibers and a rubber layer laminated thereon. The sheet 105 is adhered at the peripheral edge to the forward portion of the housing with the rubber layer being directed outwardly. The center of the sheet 105 is provided with a circular aperture having a diameter slightly smaller than the external diameter of the barrel 103. When the barrel 103 is inserted rearwardly into the circular aperture of the sheet 105, the latter is deformed along the outer perimeter of the barrel to fully block the gap between the opening 101 and the barrel 103, as shown in FIG. 21. A cover 107 is disposed forwardly of the housing 1 to provide an aesthetic appearance.

FIG. 6 further shows a distance display mechanism in the finder.

The distance display mechanism comprises a slide lever 83 actuated by a lever 82 which follows the cam groove 20 on the cam plate 18. The slide lever 83 is supported to be slidable transversely through pins 84a, 84b and guide openings 83a, 83b. The slide lever 83 is provided with pointers 83W and 83T which are disposed forwardly of a fixed lens 7a in the finder optical system such that they will selectively appear in the field of view of the finder.

Figure 22:
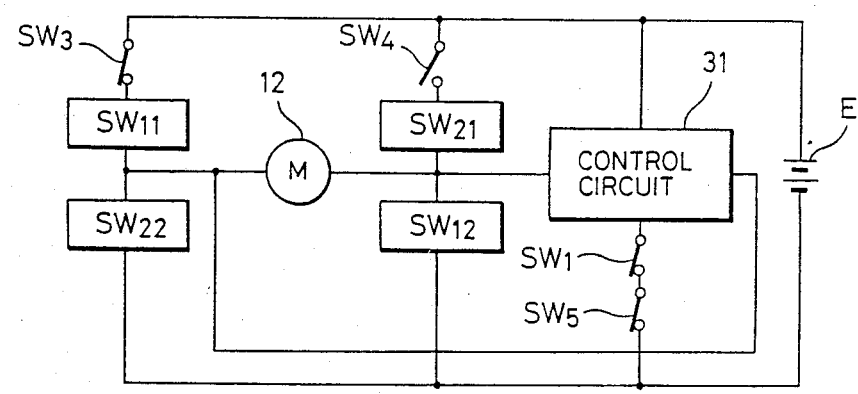
FIG. 22 is a circuit diagram of a motor drive.
Figure 23:
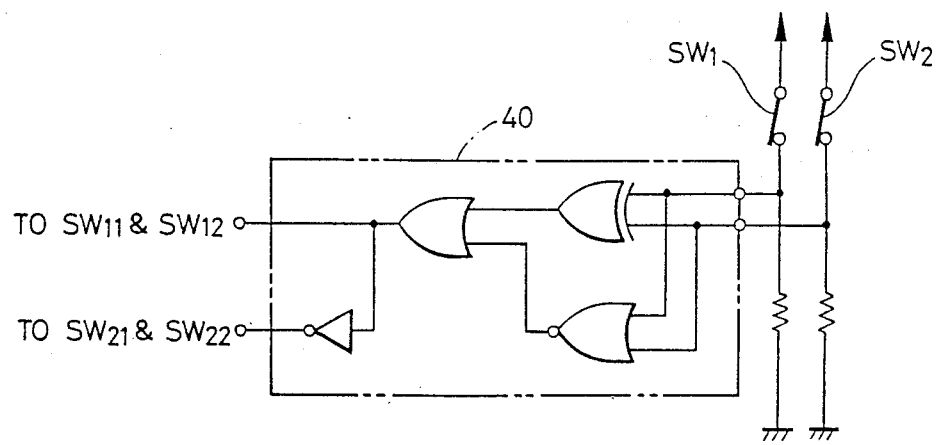
FIG. 23 is a diagram of a logic circuit.

FIG. 22 shows a motor control circuit for driving the optical system (3, 4). The motor control circuit comprises the switch SW1 shown in FIG. 1 and other switches SW3, SW4 and SW5. These switches SW3, SW4 and SW5 are actuated by the motion of the base plate 10. When the primary lens system 3 is in its retracted position, the switch SW3 is in its OFF position. When the primary lens system 3 is in its extended position, the switch SW4 is in its OFF position. When the primary lens system 3 is in its intermediate position between the retracted and extended positions, the switch SW5 is in its OFF position. The circuit also includes switches SW11, SW12 SW21 and SW22 which are semiconductor switches controlled by a logic circuit 40 shown in FIG. 23.

The motor 12 is forwardly energized through the switches SW3, SW11 and SW12 and rearwardly energized through the switches SW4, SW21 and SW22. The forward and rearward energizations of the motor 12 are controlled by a control circuit 31 for automatic focusing.

Table 2 shows the conditions of the switches SW1 and SW 2 changed depending on the positions of the dust protective cover 2, and selector knob 5; the conditions of the switched SW11, SW12, SW21 and SW22; and the positional relationship between the primary and secondary lens systems 3 and 4.

TABLE 2

| cover 2 | KNOB 5 | SW1 | SW2 | SW11 SW12 | SW21 SW22 | MAIN LENS 3 | SUB LENS 4 |
| --- | --- | --- | --- | --- | --- | --- | --- |
| OPEN | T | ON | ON | OFF | ON | EXTENDED | FULL INSERTION |
| OPEN | W | ON | OFF | ON | OFF | RETRACTED | FULL RETRACTION |
| CLOSE | T | OFF | ON | ON | OFF | RETRACTED | FULL RETRACTION |
| CLOSE | W | OFF | OFF | ON | OFF | RETRACTED | FULL RETRACTION |

Figure 24:
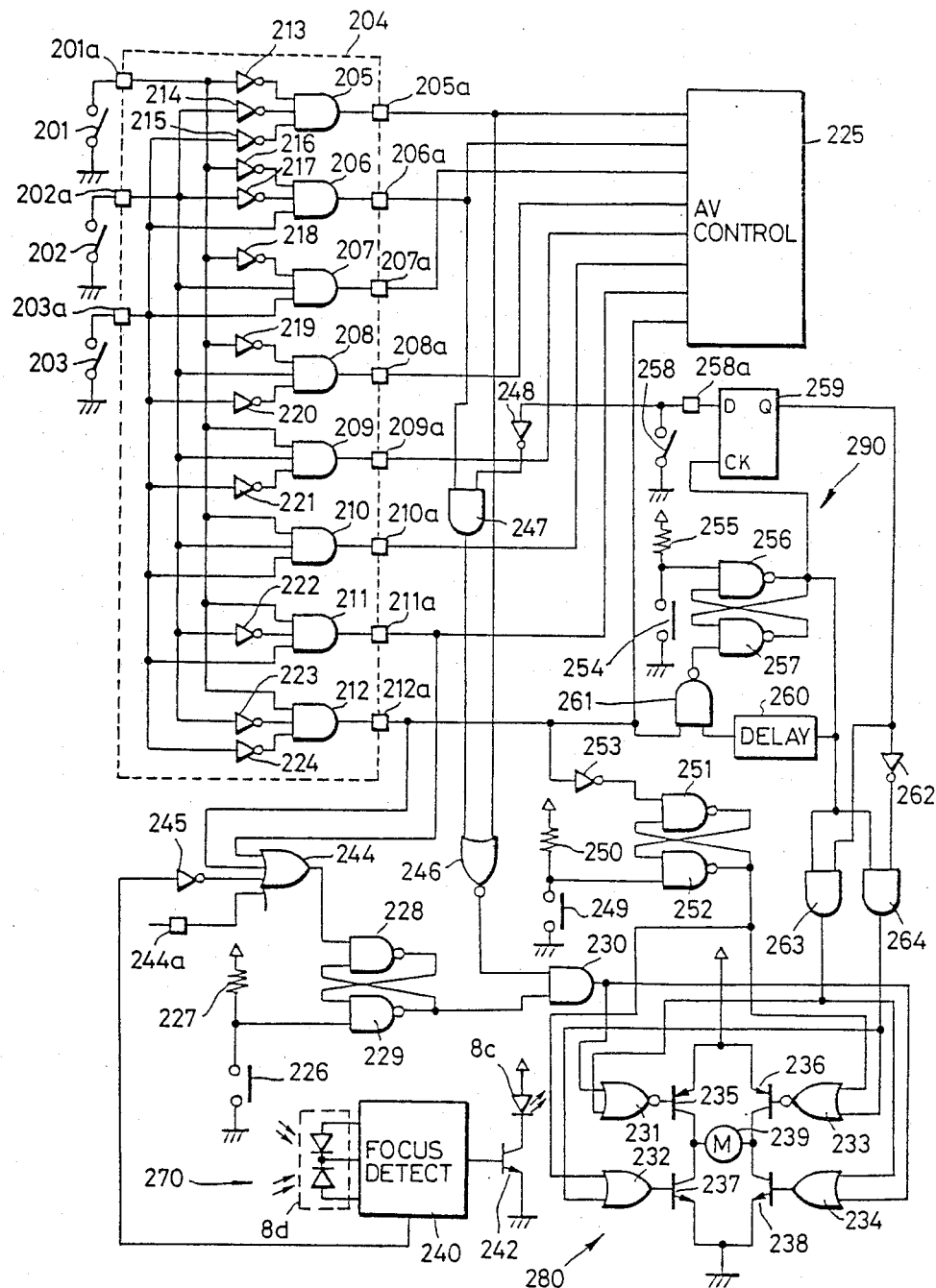
FIG. 24 is a circuit diagram of an electrical controlling apparatus.

FIG. 24 shows a concrete arrangement of the control circuit. The control circuit comprises a decoder 204 for decoding the output of the encoder to provide information concerning the position of the photo-taking optical system, a focus detector 270, a drive 280 and a changer 290. The decoder 204 includes input terminals 201a–203a receiving signals from switches 201, 202 and 203 which respectively correspond to the CODE A, CODE B and CODE C from the outputs of the encoder, AND gates 205-212 and inverters 213-224 which are combined together in various forms; and output terminals 205a –212a. These output terminals ar connected with a stop control circuit 225.

The focus detector 270 includes a focus detecting circuit 240 which is connected with the light emitting element 8c through a transistor 242 and with the light receiving element 8d.

The driver 280 comprises PNP transistors 235, 236 and NPN transistors 237 , 238 for switching the drive motor 12 from one mode to the other mode; and NOR gates 231, 233 and OR gates 232, 234 for controlling the transistors, respectively.

The changer 290 comprises a D-flip flop 259, an R-S flip flop including NAND gates 256 and 257, and a delay circuit 260. The D-input terminal of the D-flip flop 259 is connected with a telephoto detecting switch 258 through a terminal 258a. The output of the delay circuit 260 is connected with the input of the NAND gate 257 of the R-S flip flop through a NAND gate 261. NAND gate 256 is connected with a resistor 255 and an optical system change indicating switch 254. The telephoto detecting switch 258 is adapted to receive signals from the pattern 63e in the encoder.

The focus detecting circuit 240 is connected with the driver 280 through an inverter 245, an R-S flip flop including OR gate 244 and NAND gates 228, 229 and an AND gate 230. The OR gate 244 is connected with a reset terminal 244a. NAND gate 229 is connected with a resistor 227 and a manual switch 226.

The changer 290 is connected with the driver 280 through an inverter 262 and AND gates 263 and 264.

The detector 204 is connected with the input of AND gate 230 thorugh AND gate 247 and NOR gate 246, with the terminal 212a thereof being connected with NAND gate 261 and OR gate 224. The terminal 212a also is connected with an R-S flip flop including NAND gates 251, 252 through an inverter 253. NAND gate 252 is connected with a switch 249 for resetting the photo-taking optical system and a resistor 250.

The following adjustment is carried out on assembling a variable focus camera including the above arrangement.

The following adjustment is generally classified into three steps:

(a) First step for adjusting the extended distance of the photo-taking optical system (3,4) required to change it fron the wide-angle region to the telephoto region;

(b) Second step for adjusting the spacing between the photo-taking optical system (3, 4) and the surface of a film; and (c) Third step for adjusting the phase relationship between the photo-taking optical system (3, 4) and associated members such as the cam member 53 and others.

The first adjusting step (a) may be accomplished by first setting the base plate 10 carrying the lens systems 3 and 4 on a jig including guide means and a collimator and then rotating the sleve 4a relative to the support ring 4b such that an infinity object will be imaged in the same condition for the wide-angle mode of only the primary lens system 3 and for the telephoto of both the primary and secondary lens systems 3 and 4.

Figure 7:
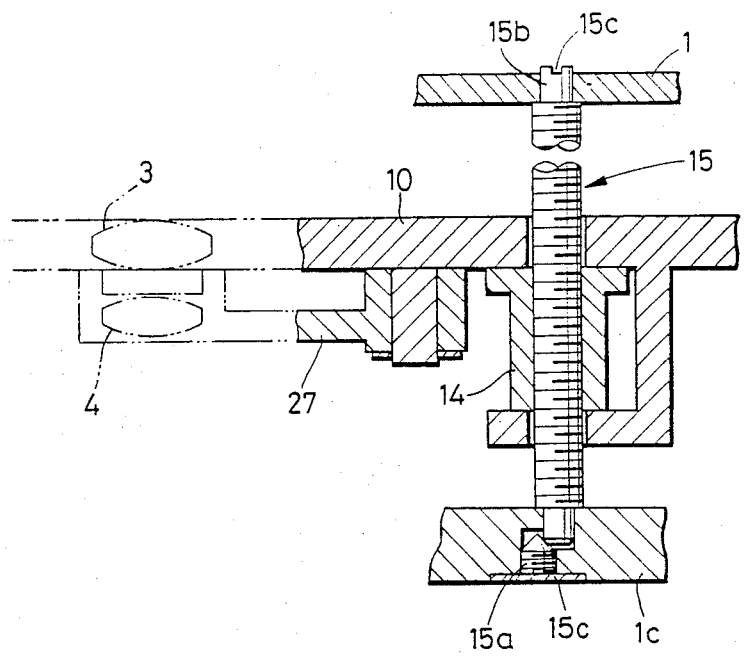
FIG. 7 is a cross-sectional view of an adjusting mechanism for a base plate.

The second adjusting step (b) is performed by utilizing the guide shaft 15 shown in FIG. 7. The gears 52b and 52a are previously disengaged from each other. Thereafter, the motor 12 is energized to coarsely move the base plate 10 such that the photo-taking optical system will be focused on an object spaced from the camera, for example, by 2.4 meters for the wide-angle mode. The collimator is then used to effect a fine adjustment while rotating the guide shaft 15 by means of a screw driver engaging the tip portion 15b thereof.

The third adjusting step (c) is carried out by re-engaging the gear 52b with the gear 53a after completion of the second step (b) and utilizing the screw 71b on the strut 50a fitted into the groove 71a in the cam plate 71 and the screw 62b fitted into the groove 62a in the foundation plate 62. The pointer on the cam plate 71 shown in FIG. 18 is first positioned relative to the pointer on the lever 73 and the screw 71b is then tightened. The foundation plate 62 is then positioned and the screw 62b is tightened. More concretely, the third step is effected by detecting an electrically conductive position whereat the brush 61a of the detecting brush plate 61 contacts the reference position adjusting pattern 63f on the foundation plate 62.

The AF optical system may then be adjusted by the use of the eccentric pin 75c.

Operation will now be described.

(1) The switches SW1 and SW2 are in their ON state when the primary lens system 3 has already been in its extended position with the cover 2 being opened and with the selector knob 5 being set at the telephoto position, as shown in FIG. 1. The switches SW11 and SW12 are in their OFF state and the switches SW21 and SW22 are in their On state (see Table 2). Moreover, the switches SW3, SW4 and SW5 are in ON, OFF and ON states, respectively.

At this time, the secondary lens system 4 is at its fully inserted position, as shown in FIG. 9A. Therefore; both the lens systems 3 and 4 define a telephoto lens system together. Since both the switches SW1 and SW5 are in their ON state, the automatic focusing and shutter control circuit 31 is operative so that the telephoto lens system can be used for photographing.

Figure 16:
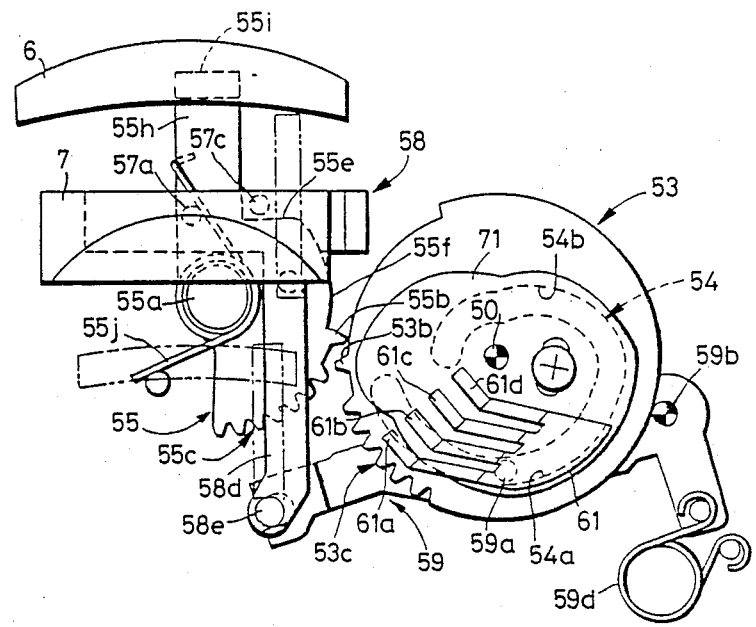
FIGS. 16 and 17 are plan views showing a change mechanism for a finder optical system.

The finder optical system also is in its telephoto mode as shown in FIG. 16 wherein the first objective 56 is placed forwardly of the second objective 57.

When a photographing operation is initiated by depressing a release button, the motor 12 is energized to move the base plate 10 such that the lens systems 3 and 4 will be shifted from the infinity point to the close point in the telephoto region along the optical axis to adjust the focus.

During the focus adjustment in the telephoto region, the cam member 53 is rotated. As shown in FIG. 16, however, the tooth 53b on the cam member 53 is disengaged from the tooth 55b on the change lever 55. Further, the driven pin 59a on the pivot lever 59 can be moved only within the range of the first circumferential groove 54a in the cam groove 54. Therefore, the finder optical system will not be moved.

(2) When the selector knob 5 is changed from the positon T to the positon W, the switch SW2 is turned off; the switches SW11 and SW12 are turned on; and the switches SW21 and SW22 are turned off. The primary lens system 3 is in its extended position while the switches SW3, SW4 and SW5 are in ON, OFF ON states, respectively. As a result, the motor 12 is forwardly rotated to initiate the movement of the primary lens system 3 from its extended position to its retracted position.

On the initial rotation of the motor 12, the secondary lens system 4 is shifted along the optical axis to its partially inserted position shown by a phantom line in FIG. 9A.

Before the holder 27 is lifted by the cam 26a in the first slope section B, the contact portion 27e of the holder 27 contacts the first contact face 30b of the stopping plate 30a. The contact portion 27e is opposed to the notch 30d before the secondary lens system 4 reaches its partially inserted position. FIG. 12A shows a state immediately before the above state. Thus, the holder 27 can be pivoted across the optical axis. When the motor 12 continues to rotate, therefore the holder 27 is forced counter-clockwise across the optical axis of the primary lens system 3 toward such a state as shown in FIG. 9B under the action of the first slope section B of the cam 26a.

When the motor 12 is further rotated, the stylus 27d on the holder 27 moves to the second flat section C past the first slope section B. Thus, the second contact face 30c of the stopping plate 30a will contact the contact portion 27e of the holder 27 (FIG. 12B).

As the stylus 27d further moves downwardly on the second slope section D, the slide portion 27c also moves along the second slope section D under the action of the spring 30 toward the fully retracted position shown by the phantom line in FIG. 9B. At this time, the primary lens system 3 reaches its retracted position. At the same time, the contact portion 27e is dis-engaged from the second contact face 30c and faced to the outer peripheral face 30e.

When the primary lens system 3 reaches its retracted positon, the switches SW3, SW4 and SW5 are placed at OFF, ON and ON states, respectively. When the switch SW3 is turned off, the first path aforementioned is cut off to de-energize the motor 12. Thus, the primary lens system 3 is stopped at its retracted position while the secondary lens system 4 is stopped at its fully retracted positon. As a result, the photo-taking optical system will use only the primary lens system 3 with the focal length being set at the wide-angle region. Since both the switches SW1 and SW5 are in their ON state, the automatic focusing and shutter control circuit 31 is operative such that a photographing operation can be carried out in the wide-angle region.

With the above change of the photo-taking optical system, the finder optical system also is changed by the finder changing mechanism such that the first finder lens system 6 is moved from its inserted position to its retracted position.

Figure 17:
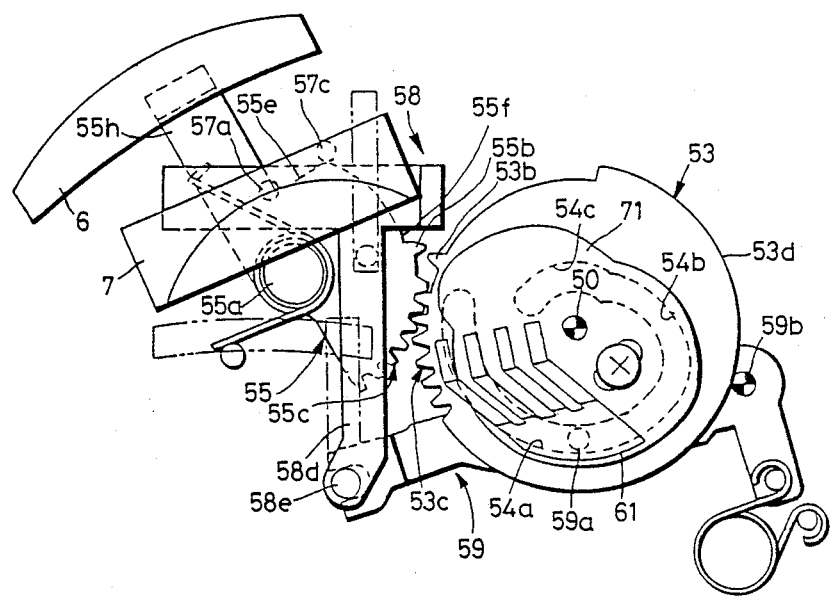

When the camera is changed from the telephoto mode to the wide-angle mode, the base plate 10 is rearwardly moved to move the rack 51 backwardly. Thus, the cam member 53 will be rotated through the engagement of the rack teeth 51b with the gear 53a. The rotation of the cam member 53 causes the tooth 53b to force the tooth 55b, resulting in the engagement of the tooth train 53c with the tooth train 55c. As shown in FIG. 17, therefore, the change lever 55 is rotated to urge the rod 57c against the first cam face 55e, so that the second finder lens system 7 is rotated counterclockwise about the pivot pin 57a through a predetermined angle. When the rod 57c reaches the second cam face 55f, the second finder lens system 7 is held with a predetermined angle. In synchronization with the angular movement of the second lens system 7, the first lens system 6 also is moved as shown in FIG. 5.

Thereafter, the driven pin 59a of the pivot lever 59 is moved from the first circumferential groove 54a to the drive groove 54b on the cam groove 54. Thus the pivot lever 59 is rotated clockwise to force the holder 58 forwardly. Upon forward movement of the holder 58, the rod 57c is moved out of the cam face 55f, the second lens system 7 is returned to its forwardly faced position and then forced forwardly in place of the first lens system 6. In this manner, a wide-angle finder optical system will be obtained.

The AF system and finder distance display will be changed at the same time as those of the above systems.

As shown in FIG. 20, the driven end 73a of the cam lever 73 is placed in the telephoto region h on the cam face of the cam plate 71 under the telephoto state. When the cam member 53 is rotated, however, the driven end 73a is moved beyond the telephoto infinity point f which is a focusing initiation position in the telephoto region h and to the transient region d through the standby region e and finally to the wide-angle region c. Ultimately, as shown in FIG. 19, the driven end 73a is positioned at the wide-angle infinity point a which is a focusing initiation position in the wide-angle region c.

As a result, the light emitting element 8c will be directed to the infinity point substantially parallel to the optical axis of the primary lens system 3.

When the base plate 10 is moved backwardly on changing the camera from the telephoto mode to wide angle mode, the cam plate 18 also is moved backwardly to a position shown in FIG. 6. The driven pin 82a is shifted in the cam groove 20 to retract the telephoto pointer 83T out of the finder view and then to move the wide-angle pointer 83W into the finder view.

When the release button is depressed, the motor 12 is energized to move the base plate 10 such that the primary lens system 3 will be extended from the infinity point to the close point in the wide-angle region to adjust the focus.

The linear movement of the base plate 10 is converted into the rotational movement of the cam member 53. As a result, the cam lever 73 is rotated to be compatible with the photographing distance. In the wide-angle photographing, the driven end 73a is moved from the infinity point a to the close point b in the wide-angle region. In the telephoto photographing, the driven end 73a is moved from the infinity point f to the close point g in the telephoto region h.

The rotation of the cam lever 73 causes the light emitting element 8c to incline from the infinity point to the close point. When an object is struck by the beam from the light-emitting element 8c, the light is reflected by the object toward the light receiving element 8d. Thus, the output of the light receiving element 8d is varied. The varied output of the element 8d is calculated by a distance metering device. If the calculated output becomes equal to a preselected focus detecting output level, the motor 12 is then de-energized. At this time, the photo-taking optical system is focused to the object. At the same time, the light emitting element 8c also is de-energized.

When the base plate 10 is moved forwardly or rearwardly, the slide lever 83 is transversely moved through the driven pin 82a engaging in the cam groove 20 on the cam plate 18 to move the pointer 83W in the finder view. When this pointer 83W is observed through the finder, one can know a substantially exact distance between the camera and the object. In the telephoto photographing, the pointer 83T is used in place of the pointer 83W.

When the release button is released, the motor 12 is rearwardly energized to retract the primary lens system 3 to the infinity point in the wide-angle region. At the same time, the driven end 73a of the cam lever 73 is positioned opposed to the infinity point a for the next photographing operation.

(3) When the cover 2 is moved from its opened position to its closed position in the telephoto mode, the switch SW1 is turned off. In spite of the selector knob 5 set at its telephoto position, therefore, the primary lens system 3 is moved from its extended position to its retracted position while the secondary lens system 4 is shifted from its fully inserted position to its fully retracted position.

When the primary lens system 3 is moved to its retracted position, the cover 2 can completely be shifted to its closed position. When the switch SW1 is turned off, the automatic focusing and shutter control circuit 31 is de-energized to disable any photographing.

At the same time, the finder optical system, AF system and others also are changed from the telephoto positions to the wide-angle positions.

(4) When the cover 2 is shifted to its closed position in the wide-angle mode, the switch SW1 is turned off to de-energize the automatic focusing and shutter control circuit 31 to disable any photographing.

(5) When the selector knob 5 is changed from the wide angle position shown in FIG. 4 to the telephoto position T, the switch SW2 is turned on; the switches SW11 and SW12 are turned off; and the switches SW21 and SW22 are turned on. Since the primary lens system 3 is in its retracted position, the switches SW3, SW4 and SW5 are placed at OFF, ON and ON states, respectively. Therefore, the motor 12 begins to rotate backwardly, so that the primary lens system 3 initiates to move from its retracted position to its extended position.

With this initial backward rotation of the motor 12, the secondary lens system 4 is moved to its fully inserted position shown by solid lines in FIG. 9A through its partially retracted and inserted positions respectively shown by phantom lines in FIG. 9B. Such a movement of the secondary lens system 4 is accomplished by co-operation of the face cam 26a with the stopping plate 30a and the holder 27 as in case of the second stage (2). However, the rotational direction of the respective components is inverse relative to that of the stage (2).

When the secondary lens system 4 has been placed at its fully inserted position, the primary lens system 3 reaches its extended position. At the same time, the contact portion 27a of the holder 27 is dis-engaged from the first contact face 30b of 30a and positioned opposed to the outer periphery 30e.

Figure 25:
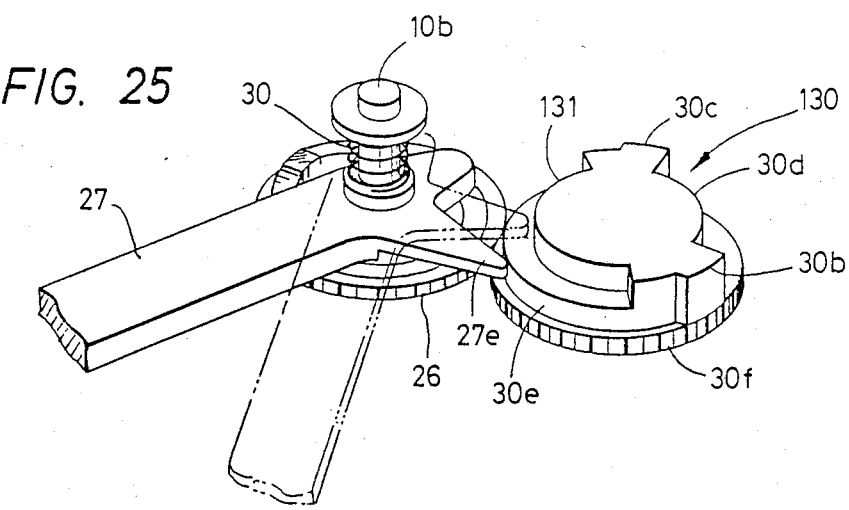
FIG. 25 is a perspective view showing the primary parts of a modification of the drive mechanism for the secondary lens system.

If a stopping plate 130 is used which has a partial notch 131 formed on the upper portion of the outer periphery 30e as shown in FIG. 25, the adjustment of the optical systems may more readily be made. When the secondary lens system 4 is in its fully retracted or inserted position, the contact portion 27e of the holder 27 is in contact with the outer periphery 30e. In such a situation, if the holder 27 is lifted along the shaft 10b against the biasing force of the spring 30, the contact portion 27e is shifted into opposition to the notch 131. Since the notch 131 is located out of the path of the pivoted contact portion 27e, the holder can manually be moved to any position as shown by phantom lines in FIG. 25.

When the primary lens system 3 reaches its extended position to enable a photographing operation in the telephoto mode, the changing operation from the wide-angle mode to the telephoto mode returns the finder optical system to the state shown in FIG. 16. At the same time, the in-finder distance display also is changed by an operation which is inverse relative to the aforementioned stage (2).

Figure 26:
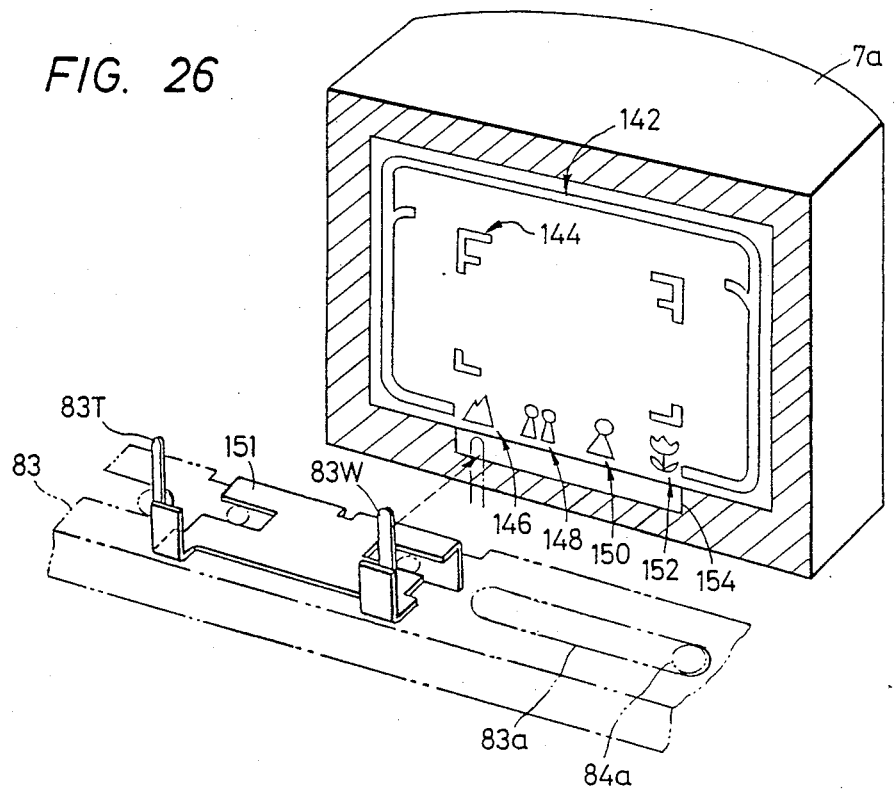
FIG. 26 is a perspective view of a finder display.

An Albada finder is provided on the inner wall of the second finder lens system 7a, through which one can observe a wide-angle view frame 142, a telephoto view frame 144 and reflective images of distance zone marks indicative of a range in which an object can be photographed, as shown in FIG. 26.

Distance zone marks include mark 146 indicative of the long range including the infinity point, a mark 148 indicative of the intermediate range, a mark 150 indicative of a short range and a mark 152 indicative of a close range. These distance zone marks are indicated by the wide-angle and telephoto pointers 83W and 83T in the display frame 154. In order that the view frame 142 defining the range of view in the wide-angle mode can properly be used when one of the distance zone marks is indicated by the pointer 83W, the pointer 83W is colored by the same color as that of the view frame 142, for example yellow color. Similarly, the pointer 83T is colored by the same color as that of the view frame 144, for example red color. In this manner, the focal lengths of the photo-taking optical system can clearly be distinguished from one another by the colored pointers and at the same time the view frame to be used therefor can clearly and positively be selected by an operator.

The pointers 83T and 83W are rigidly mounted on a pointer plate 151. As shown in FIG. 6, the pointer plate 151 is mounted on the slide lever 83. The sliding movement of the slide lever 83 is controlled in accordance with the configuration of the cam groove 20 on the cam plate 18 which moves with the base plate 10 along the optical axis.

Assuming that the focal length of the photo-taking lens is f and the distance between the photo-taking lens and an object is R, the movement Δ of the photo-taking lens from the infinity position required to form an image on the film face may be represented by:

$$\Delta = f^2/R \tag{1}$$

When an image plane symbolized by each of the distance zone marks 146, 148, 150 and 152 is formed on a film, a distance between the camera and an object in the wide-angle mode is different from that in the telephoto mode. For example, when it is desired to shoot the half figure of a person over the full range of a picture plane, the camera will be set nearer the object in the wide-angle mode or farther from the object in the telephoto mode. Now supposing that the focal length of the photo-taking lens in the wide-angle mode is fW and that in the wide-angle mode, distances corresponding to the close range, short range and intermediate range marks 152, 150 and 148 are respectively R1, R2 and R3, subject distances corresponding to the close range, short range and intermediate range marks 152, 150 and 148 for the focal length fT in the telephoto mode are respectively (fW/fT)×R1, (fW/fT)×R2 and (fW/fT)×R3 since the magnification of the image is proportional to the focal length.

As is apparent from the aforementioned formula (1), the movement of the extended photo-taking lens is proportional to the second power of the focal length f but inversely proportional to the subject distance R. Therefore, if the zone marks are arranged so as to be inversely proportional to the subject distance R, the distance pointer 83T or 83W may be moved in association with the movement of the base plate 10 with a predetermined ratio so far as the focal length is not changed.

Assuming that the movement of the distance pointer 83T or 83W from the infinity (∞) position is Z and that the extension of the photo-taking lens (the movement of the base plate 10) is Δ, the following formula can be obtained:

$$\begin{aligned} Z &= k \cdot \Delta \quad (k \text{ is association ratio}) \\ &= k \cdot f^2/R \end{aligned} \tag{2}$$

When the focal length of the photo-taking lens is changed from the wide-angle (fW) to the telephoto (fT) and when it is assumed that the movements of the distance pointer in both the wide-angle and telephoto modes are respectively ZW and ZT and that the corresponding subject distances are respectively RW and RT, the movements of the pointer are represented from the formula (2) as follows:

$$\begin{aligned} ZW &= k_1 \cdot fW^2/RW \\ ZT &= k_2 \cdot fT^2/RT \end{aligned} \tag{3}$$

Figure 27:
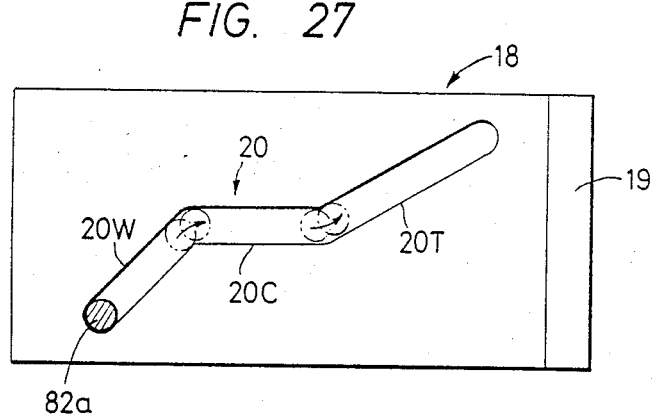
FIG. 27 is a plan view of a cam plate.

As shown in FIG. 27, the cam plate 18 includes a wide-angle cam groove 20W, telephoto cam groove 20T and an intermediate cam groove 20C between the wide-angle and telephoto grooves and extending parallel to the optical axis. Each of the cam grooves 20W and 20T has a lift or inclination relative to the direction of the moving base plate 10 which is inversely proportional to the focal length.

FIGS. 6, 26 and 27 show various components located at their infinity positions in the wide-angle mode. The wide-angle distance pointer 83W indicates the mark 146. In such a situation, the engagement pin 82a is located in one end of the wide-angle cam groove 20W.

When the same zone mark is indicated by either of the wide-angle or telephoto distance pointer (83W; 83T), that is, ZW=ZT, the subject distance should be:

$$RT = (fT/fW) \cdot RW \tag{4}$$

in connection with the image magnification of the photo-taking lens as be described hereinbefore.

When ZW is equal to ZT in the formula (3), $$k_1 \cdot fW^2/RW = k_2 \cdot fT^2/RT.$$

Substituting the formula (4) for the just above formula, the following relationship can be obtained:

$$k_2 = k_1 \times fW/fT \tag{5}$$

In other words, if in the telephoto mode, a mechanism for changing the association ratio to (fW/fT) is added to the mechanism for interlocking between the base plate 10 and the slide lever 83 in the wide-angle mode, a distance display mechanism fulfilling the formula (5) can be obtained. Inclinations hT, hW of the telephoto and wide-angle cam grooves in the cam plate 18 may be arranged such that the ratio therebetween will satisfy hT/hW=fW/fT.

When the base plate 10 is moved to adjust the focus in the wide-angle nu;de the pin 82a is shifted following the lift of the cam groove 20W to rotate the lever 82 clockwise. Therefore, the slide lever 83 is slid to move the wide-angle distance pointer 83W rightwardly as viewed in FIG. 26 such that the zone marks will be scanned by the pointer 83W.

When the base plate 10 is extended to the close distance position in the wide-angle mode, the pin 82a contacts the right-hand end of the cam groove 83W as viewed in FIG. 27. At this time, the pointer 83W points out the mark 152.

When the base plate 10 is further slightly moved, the pin 82a reaches the left-hand end of the cam groove 20C. The pointer 83W is retracted out of the right-hand end of the display frame 154. At the same time, the telephoto distance pointer 83T is located out of the left-hand side of the display frame 154. When the base plate 10 is further extended to the focus change region, the pin 82a is slidably moved within the groove 20C. Since the groove 20C extends parallel to the optical axis, the pin 82a will not be rotated by the groove 20C. Therefore, the pointers 83W and 83T are maintained out of the display frame 154.

Upon completion of the focus changing operation, the pin 82a reaches the right-hand end of the groove 20C. When the base plate 10 reaches the infinity point in the telephoto mode, the pin 82a is slightly lifted along the cam groove 20T. Thus, the pointer 83T is opposed to the mark 146 in the display frame 154.

When the base plate 10 is further moved for focusing in the telephoto mode, the pin 82a is upwardly shifted in accordance with the lift of the cam groove 20T. Thus, the slide lever 83 is slid causing the pointer 83T to scan the zone marks.

Figure 28:
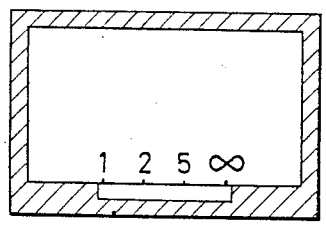
FIG. 28 is a view showing a modified finder display.

If it is desired that a scale indicative of actual subject distances as shown in FIG. 28 is used in place of the zone marks shown in FIG. 26, the scale in the finder may be used as a common scale for both the wide-angle and telephoto mode by establishing RW=RT and ZW=ZT. Thus, from the formula (3), the following relationhsip can be obtained:

$$(k_2/k_1) = (fW^2/fT^2) \qquad (6)$$

where k is the association ratio of the mechanism for interlocking the photo-taking lens with the distance display in the wide-angle mode and k is the association ratio of the same mechanism in the telephoto mode.

As will be apparent from the above formula (6), when the distance scale is indicated by the pointer, the interlocking mechanism may additionally have a mechanism for changing the association ratio in inverse proportion to the second power of the focal length depending on variations thereof. This will be described below with reference to FIG. 29.

Figure 29:
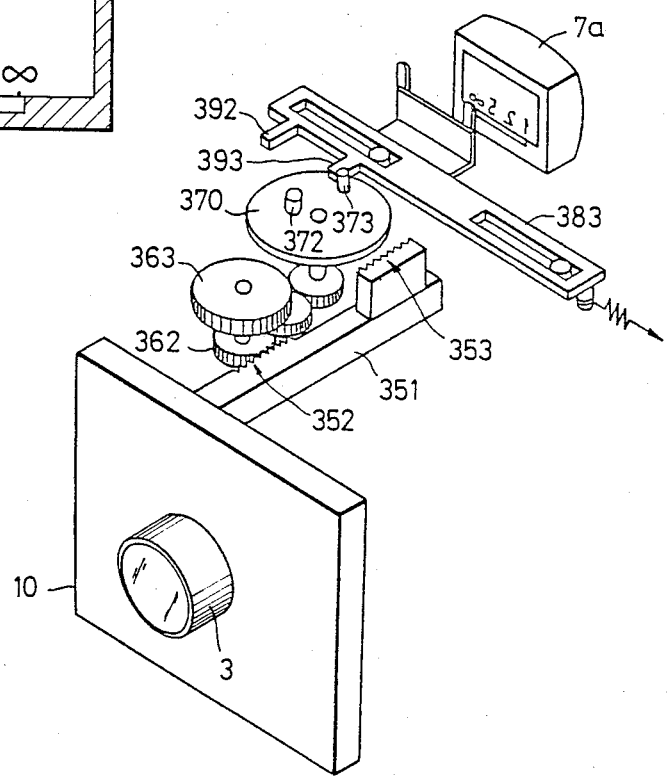
FIG. 29 is a perspective view of a drive mechanism for the finder display shown in FIG. 28.

As seen from FIG. 29, the base plate 10 includes a strut 351 having a wide-angle rack 352 formed thereon at the side and a telephoto rack 353 formed thereon at the top.

The rack 352 is engaged by a gear 362 which is formed integrally with a gear 363 engaging the rack 353. A ratio of the diameter DW of the pitch circle in the gear 362 to the diameter DT of a pitch circle in the gear 363 (DW/DT) is substantially equal to the ratio of the focal length fW in the wide-angle mode to the focal length fT in the telephoto mode (fW/fT). The gear 362 is coupled with a disc 370 through a gear train. The disc 370 includes pins 372 and 373 formed thereon at the top. A ratio of the radius of gyration rW in the pin 372 to the radius of gyration rT in the pin 373 (rW/rT) is substantially equal to the ratio fT/fW of the focal lengths in the telephoto and wide-angle modes.

A slide lever 383 has lugs 392 and 393. The lug 392 has such a length that it can be engaged by the pin 372 while the lug 393 has such a length that it can be engaged by the pin 373.

The illustrated embodiment is a camera adapted to adjust its focus by moving the secondary lens system as well as the primary lens system in the telephoto mode. In a camera of a different type wherein only the primary lens system is moved to adjust the focus even after the secondary ens system has been added, however, the primary lens system is moved by the same amount in both the wide-angle and telephoto modes even if the focal length thereof is changed. Accordingly. it is not required that the association ratio between the pointer indicating the distance scale and the primary lens system is changed. In such a case, the cam grooves 20W and 20T may be sloped with the same inclination.

The photographing and system changing operations will be described concretely with reference to FIG. 24.

The same photographing operation is carried out in both the wide-angle and telephoto modes.

Signals from the decoder 204, which are indicative of the extension of the photo-taking optical system, that is, the subject distance, are coupled with the input of the stop control circuit 225 to set a photographing condition for each step. First of all, a distance is metered at the step 8 in the encoder.

When a manual switch 226 is turned on, the output of the R-S flip flop (228, 229) becomes "H" level as will be described, the output of the AND gate 230 becomes "H" level; the output of the NOR gate 231 becomes "L" level; and the output of the OR gate 234 becomes "H" level. Therefore, the transistors 235 and 238 are turned on to rotate the motor 12 forwardly. The forward rotation of the motor 12 drives the photo-taking optical system and at the same time inclines the light emitting element 8c for scanning The focus detecting circuit 240 provides "H" level to the OR gate 244 through the inverter 245 when the photo-taking optical system is focused, depending on the output of the light receiving element 8d.

The output terminals 211a and 212a of the decoder connected with the OR gate 244 become "H" level only at the steps 7 and 8. Thus, since these outputs are in "L" level on in-focusing, the output of the OR gate 244 generates "L" signal in accordance with the output of the circuit 240. The output of the R-S flip flop (228, 229) is reset at "L". Thus, the output of the AND gate 230 also becomes "L" to de-energize the motor 12.

Upon completion of the exposure, a reset switch 249 is turned on to set the output of the R-S flip flop (251, 252) at "H" level. NOR gate 233 and OR gate 232 generate their outputs "L" and "H", respectively. The transistors 236 and 237 are turned on to energize the motor 12 backwardly. The backward rotation of the motor 12 returns the photo-taking optical system to the step 8 from one of the steps other than the step 8.

When the motor 12 is rotated backwardly, the photo-taking optical system is retracted to the step 8 whereat AND gate 212 of the decoder 204 generates "H" at the output terminal 212a thereof. Thus, the output of the R-S flip flop (251, 252) is reset at "L" through the inverter 253 to stop the motor 12.

The above operation is carried out from the initiation of a photographing operation to the resetting for the next photographing operation.

When the manual switch 226 is turned on to initiate the focus detection, the motor 12 is rotated forwardly and at the same time the brushes slide on the encoder patterns shown in FIG. 15. In any event, the start is at the step 8. At this time, the output terminals 211a and 212a are necessarily placed at "H" level. Even if any focus detection signal is inputted from the circuit 240, the signal will be ignored.

Since the output of the focus detecting circuit 240 is initially placed at "H" level when an object is at the infinity point, a signal for de-energizing the motor 12 is produced immediately at the step 6. When the motor 12 is actually stopped, its position is set as the infinity point.

If the subject distance is too small, NOR gate 246 receives "H" level signal from the output terminal 205a or 206a of the decoder 204 at the step 1 or 2 to control the operation.

When the switch 254 is turned on to change the photo-taking optical system from the wide-angle mode to the telephoto mode, the output of the R-S flip flop (256, 257) is set and held at "H". The clock input of the D-flip flop 259 also becomes "H" so that the D filp flop 259 reads the state of the telephoto detection switch 258 through the terminal 258a. The telephoto detection switch 258 generates signals corresponding to the output signals from the pattern 63e on the encoder and is adapted to be turned on in the telephoto region T in accordance with the present embodiment.

When the switch 254 is turned on in the wide-angle region W, therefore, the output of the D-flip flop 259 becomes "H" since the telephoto detection switch 258 is turned off. Due to this output signal "H", the output of AND gate 263 is changed to "H" and NOR and OR gates 231 and 234 are changed to "H" to rotate the motor 12 forwardly. The forward rotation of the motor 12 causes the switches 201, 202 and 203 to output the steps 8–1. On reaching the step 8 in the telephoto region T beyond the transient region N, the output terminal 212a of the decoder 204 becomes "H" to reset the R-S flip flop (256, 257) at "L" through NAND gate 261 to stop the motor 12.

Delay circuit 260 prevents the NAND gate 256 from being reset immediately as the motor 12 is started.

Since the telephoto detection switch 258 is in its ON state when the photo-taking optical system is changed from the telephoto to the wide-angle, mode, the output of the D flip flop 259 becomes "L". Therefore, the output of the AND gate 263 becomes "L" while the output of the AND gate 263 is placed at "H" through the inverter 262. The motor 12 is then energized backwardly.

We claim:

1. A camera comprising:
   a photo-taking optical system having an optical axis,
     a primary lens system including an imaging lens and a secondary lens system including an optical converter:
   drive means for moving said primary lens system along said optical axis, said drive means being adapted to reciprocate said primary lens system from a first position through second and third positions to a fourth position, said positions being arranged in sequence along said optical axis;
   means for changing the focal length of said photo-taking optical system by adjusting the relative position between said primary and secondary lens systems during movement of said primary lens system between said second and third positions, said photo-taking optical system having a first focal length when said primary lens system is between said first and second positions and a second focal length when said primary lens system is between said third and fourth positions, said changing means being adapted to change said photo-taking optical system from the first focal length to the second focal length as said primary lens system is moved from said second position to said third position and to change said photo-taking optical system from the second focal length to the first focal length as said primary lens system is moved from said third position to said second position; and
   position detecting means generating an electric signal corresponding to the position of said primary lens sytem, said position detecting means having first, second, third and fourth positions respectively corresponding to said first, second, third and fourth positions of said primary lens system.

2. A camera as defined in claim 1, further comprising means for focusing said photo-taking optical system relative to an object respectively when said primary lens system is moved from said first position to said second position and when the primary lens system is moved from said third position to said fourth position.

3. A camera as defined in claim 1, further comprising means for controlling said drive means and said changing means in response to the electric signal from said position detecting means.

4. A camera as defined in claim 1, wherein said position detecting means includes an encoder having a foundation plate and a detecting element rotated relative to each other in association with the movement of said primary lens system and wherein said foundation plate is formed with patterns corresponding to said positions and a pattern representative of a reference in the positional relationship between said primary lens system and said patterns corresponding to the positions of said primary lens system.

5. A camera as defined in claim 1, wherein said position detecting means includes an encoder interlocking with the movement of said primary lens system.

6. A camera as defined in claim 1, wherein said position detecting means is displaced depending on the movement of said primary lens system.

7. A cmera comprising:
   a photo-taking optical system having an optical axis,
     a primary lens system including an imaging lens and a secondary lens system including an optical converter;
   drive means for moving said primary lens system along said optical axis, said drive means being adapted to reciprocate said primary lens system from a first position through second and third positions to a fourth position, said positions being arranged in sequence along said optical axis;
   means for changing the focal length of said photo-taking optical system by adjusting the relative position between said primary and secondary lens systems during movement of said primary lens system between said second and third positions, said photo-taking optical system having a first focal length when said primary lens system is between said first and second positions and a second focal length when said primary lens system is between said third and fourth positions, said changing means being adapted to change said photo-taking optical system from the first focal length to the second focal length as said primary lens system is moved from said second position to said third position and to change said photo-taking optical system from the second focal length to the first focal length as said primary lens system is moved from said third position to said second position;
   control cam means interlocking with the movement of said primary lens system, said control cam means having first, second and third cams continuously formed thereon;
   displacement means adapted to reciprocate between start and finish points along said control cam means;
   said displacement means being displaced from said start point to said finish point along the first cam on said control cam means in response to the movement of said primary lens system from said first position to said second position, from said finish point to said start point along said second cam in response to the movement of said primary lens system from said second position to said third position and from said start point to said finish point along said third cam in response to movement of said primary lens system from said third position to said fourth position; and
   metering means driven by said displacement means during displacement of said displacment means from said start point to said finish point.

8. A camera as defined in claim 7 wherein said metering means includes a photo-sensor, means for forming a light spot on said photo-sensor by the use of light from the object, and means for shifting said light spot on said photo-sensor in response to said displacement means.

9. A camera comprising:
a photo-taking optical system including an optical axis, a primary lens system disposed on said optical axis and having a first focal length and a secondary lens system disposed on said optical axis and forming a second focal length in co-operation with said primary lens system, said primary lens system being adapted to move within a first range on said optical axis to focus in said first focal length, to move within a second range on said optical axis to change said photo-taking optical system from said first focal length to said second focal length and to move within a third range on said optical axis to focus in said second focal length;
a display scale on which display characters associated with subject distances are successively arranged;
an indicator member having a pair of spaced pointers;
means for opposing one of said pair of pointers to said scale to indicate the scale by said one of pointers when said primary lens system is within said first range, and for opposing the other pointer to said scale to indicate the scale by the other pointer when said primary lens system is within said third range; and
means for producing relative displacement between said display scale and said indicator member in association with said primary lens system moved within each of said first range and said third range.

10. A camera as defined in claim 9 wherein said pair of pointers are formed such that one of said pointers can visually be distinguished from the other pointer.

11. A camera as deficed in claim 10 wherein said pair of pointers are colored with colors different from each other.

12. A camera as defined in claim 9, wherein said relative displacement producing means is adapted to move said indicator member such that the movement of said indicator member corresponding to the movement of said primary lens system within said second range will be smaller than the movement of said indicator member corresponding to the movement of said primary lens system within said first range and the movement of said indicator member corresponding to the movement of said primary lens sytem within said third range.

13. A camera as defined in claim 9, wherein said relative displacement producing means is adapted to move said indicator member with a first association ratio in response to the movement of said primary lens system within said first range and to move said indicator member with a second association ratio in response to the movement of said primary lens system within said third range, said first and second association ratios being different from each other corresponding to the ratio of said first focal length to said second focal length.

14. A camera comprising:
a housing;
a photo-taking optical system having an optical axis;
a moving member for holding said photo-taking optical system, said member linearly moving along said optical axis within said housing; and
a resilient member extending along said optical axis and rigidly mounted at one end on said moving member, the other end of said resilient member resiliently contacting said housing in a direction perpendicular to said optical axis.

15. A camera comprising:
a photo-taking optical system having an optical axis;
a support member holding said photo-taking optical system;
a housing;
a guide shaft member disposed along said optical axis and formed with a male screw around the perimeter thereof;
a nut member on said support member and screwed over said guide shaft member;
adjusting means on one of said guide shaft and nut members, said adjusting means including manual means for rotating said one member relative to the other and means for fixing said one member relative to said housing; and
drive means for rotating the other of said guide shaft and nut members.

16. A camera comprising:
a photo-taking optical system including an optical axis, a primary lens system disposed on said optical axis and a secondary lens system;
a tubular member holding said secondary lens system therein;
a movable holder member for holding said tubular member and moving said secondary lens system in a direction intersecting said optical axis;
a biasing member provided between said tubular member and said movable holder member;
said movable holder member including a storage portion containing said tubular member in such a manner that said tubular member is movable along an optical axis of said secondary lens system, a limit portion for preventing said tubular member from moving outwardly from one end of said storage portion and a support portion for supporting said biasing member at one end; and
said biasing member being adapted to engage said tubular member at the other end of said biasing member to bias said tubular member in engagement with said limit member while at the same time preventing said tubular member from moving outwardly from the other end of said storage portion.

17. A camera comprising:
a barrel member holding a photo-taking optical system;
a housing including an opening through which said barrel member is moved; and
a light-exclusion sheet member having an opening of a diameter smaller than the external diameter of said barrel member, said sheet member being arranged on said housing such that the opening of said sheet member is substantially aligned with the opening of said housing, said sheet member being flexible such that said barrel member can be moved through the opening of said sheet member under resilient deformation of the periphery edge of said opening of said sheet member.

18. A camera comprising:
a barrel member holding a photo-taking optical system;
a housing including an opening through which said barrel member is moved; and
an annular light-exclusion member having an opening and arranged such that the opening of said light-exclusion member is substantitlly aligned with the opening of said housing, said light-exclusion member being flexible such that said barrel member can be moved through the opening of said light-exclusion member under the resilient deformation of the peripheral edge of said opening.

19. A camera as defined in claim 18, wherein a diameter of said opening of said light-exclusion member is smaller than the external diameter of said barrel member.

20. A camera as defined in claim 18, wherein a center of said annular light-exclusion member substantially corresponds with an optical axis of said photo-taking optical system.

21. A camera comprising:
   picture-taking means, including a picture-taking optical system that enables said camera to take a picture of an object;
   drive means acting on said picture-taking optical system to change the focal length of said picture-taking optical system between a first focal length and a second focal length shorter than said first focal length;
   means for detecting the state of said picture-taking optical system with respect to the focal length;
   an operation switch generating an operation output each time the switch is operated; and
   means for controlling said drive means in response to said detecting means and said operation output so that said picture-taking optical system is changed to said second focal length when said picture-taking optical system is in said first focal length and said operation output is generated and changed to said first focal length when said picture-taking optical system is in said second focal length and said operation output is generated.

22. A camera as defined in claim 21, wherein said operation switch is normally biased to an off-state and operated from said off-state to an on-state to generate said operation output.

23. A camera as defined in claim 21, wherein said detecting means generates a first signal when said picture-taking optical system is in said first focal length and generates a second signal when said picture-taking optical system is in said second focal length, and said control means controls said drive means to change said picture-taking optical system to said second focal length when said first signal and said operation output are generated and controls said drive means to change said picture-taking optical system to said first focal length when said second signal and said operation output are generated.

24. A camera comprising:
   a photo-taking optical system;
   a housing;
   a movable member supporting said photo-taking optical system, said movable member being moved with said photo-taking optical system to change a focal length of said photo-taking optical system;
   circuit means supported by said housing for producing an electrical output corresponding to a distance from an object;
   electric motor means on said movable member for moving said photo-taking optical system along an optical axis of said photo-taking optical system in response to said electrical output for focusing on said object; and
   a flexible substrate electrically connecting said circuit means and said electric motor means, said substrate having one end fixed to said movable member and another end rigidly connected with said housing, and said substrate being folded in a gap between said movable member and said housing as said one end of said substrate is moved nearer the other end of the same in accordance with the movement of said movable member.

25. A camera as defined in claim 24, wherein said electric motor means moves said movable member with said photo-taking optical system.

26. A camera comprising:
   a housing;
   a photo-taking optical system having an optical axis and forming an optical path extending toward a focal plane on said housing;
   a movable member supporting said photo-taking optical system;
   electric motor means on said movable member for moving said photo-taking optical system along said optical axis;
   circuit means supported by said housing for producing an electrical signal to control said electric motor means; and
   a flexible substrate electrically connecting said circuit means and said electric motor means, said substrate being disposed off said optical path in one direction from said optical axis and having one end fixed to said movable member and another end rigidly connected with said housing, and said substrate being folded along folding lines in a gap between said movable member and said housing as said one end of said substrate is moved nearer the other end of the same in accordance with the movement of said movable member;
   each of said folding lines of said substrate extending substantially parallel with said one direction.

* * * * *